United States Patent
Chaumet et al.

(10) Patent No.: US 9,574,879 B2
(45) Date of Patent: Feb. 21, 2017

(54) MEMS ANGULAR INERTIAL SENSOR OPERATING IN TUNING FORK MODE

(71) Applicant: THALES, Courbevoie (FR)

(72) Inventors: Bernard Chaumet, Chatellerault (FR); Fabien Filhol, Valence (FR); Claude Rougeot, Lyons (FR); Bertrand Leverrier, Montelier (FR)

(73) Assignee: THALES, Courbevoie (FR)

( * ) Notice: Subject to any disclaimer, the term of this patent is extended or adjusted under 35 U.S.C. 154(b) by 111 days.

(21) Appl. No.: 14/750,862

(22) Filed: Jun. 25, 2015

(65) Prior Publication Data

US 2015/0377621 A1 Dec. 31, 2015

(30) Foreign Application Priority Data

Jun. 27, 2014 (FR) ..................................... 14 01451

(51) Int. Cl.
| | | |
|---|---|---|
| *G01C 19/56* | (2012.01) | |
| *G01C 19/5747* | (2012.01) | |
| *G01C 19/574* | (2012.01) | |

(52) U.S. Cl.
CPC ......... *G01C 19/5747* (2013.01); *G01C 19/574* (2013.01)

(58) Field of Classification Search
CPC .......................... G01C 19/574; G01C 19/5747
See application file for complete search history.

(56) References Cited

U.S. PATENT DOCUMENTS

| | | | |
|---|---|---|---|
| 2010/0139399 A1 | 6/2010 | Geiger et al. | |
| 2014/0299947 A1* | 10/2014 | Jeanroy | G01C 19/574 257/415 |

FOREIGN PATENT DOCUMENTS

| | | |
|---|---|---|
| FR | 2846740 A1 | 5/2004 |
| FR | 2859527 A1 | 3/2005 |
| FR | 2859528 A1 | 3/2005 |
| WO | 2013/083534 A2 | 6/2013 |
| WO | 2014/177542 A1 | 11/2014 |

\* cited by examiner

*Primary Examiner* — John Chapman, Jr.
(74) *Attorney, Agent, or Firm* — Baker & Hostetler LLP

(57) ABSTRACT

A vibrating inertial sensor is provided, micro machined in a plane thin wafer, allowing the measurement of an angular position or of an angular speed. The sensor comprises two vibrating masses suspended by springs with identical stiffness in X and Y and coupled together by identical stiffness springs in X and Y, and at least excitation transducers and detection transducers disposed on at least one of the masses. The mobile assembly consisting of a vibrating mass and the parts of transducers fastened to this mass has a generally symmetric structure with respect to an axis of symmetry OX and with respect to an axis of symmetry OY.

20 Claims, 16 Drawing Sheets

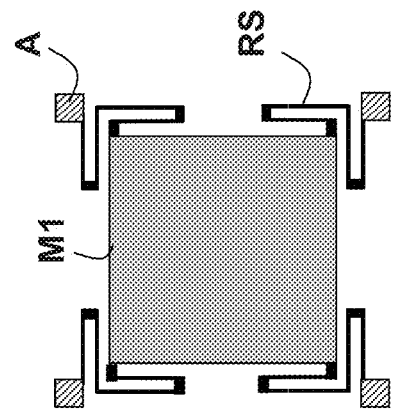
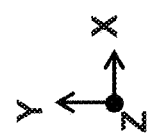
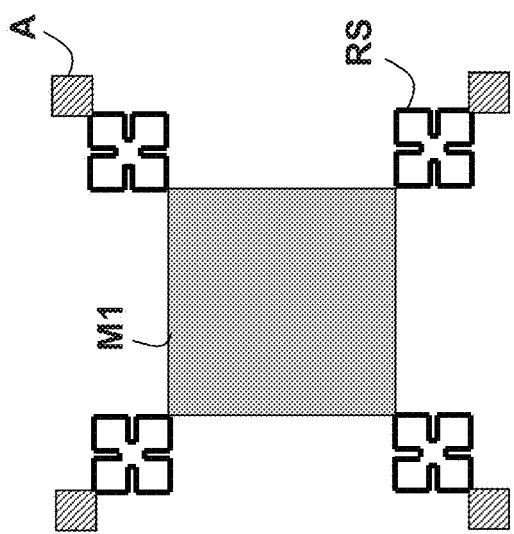
Fig. 2

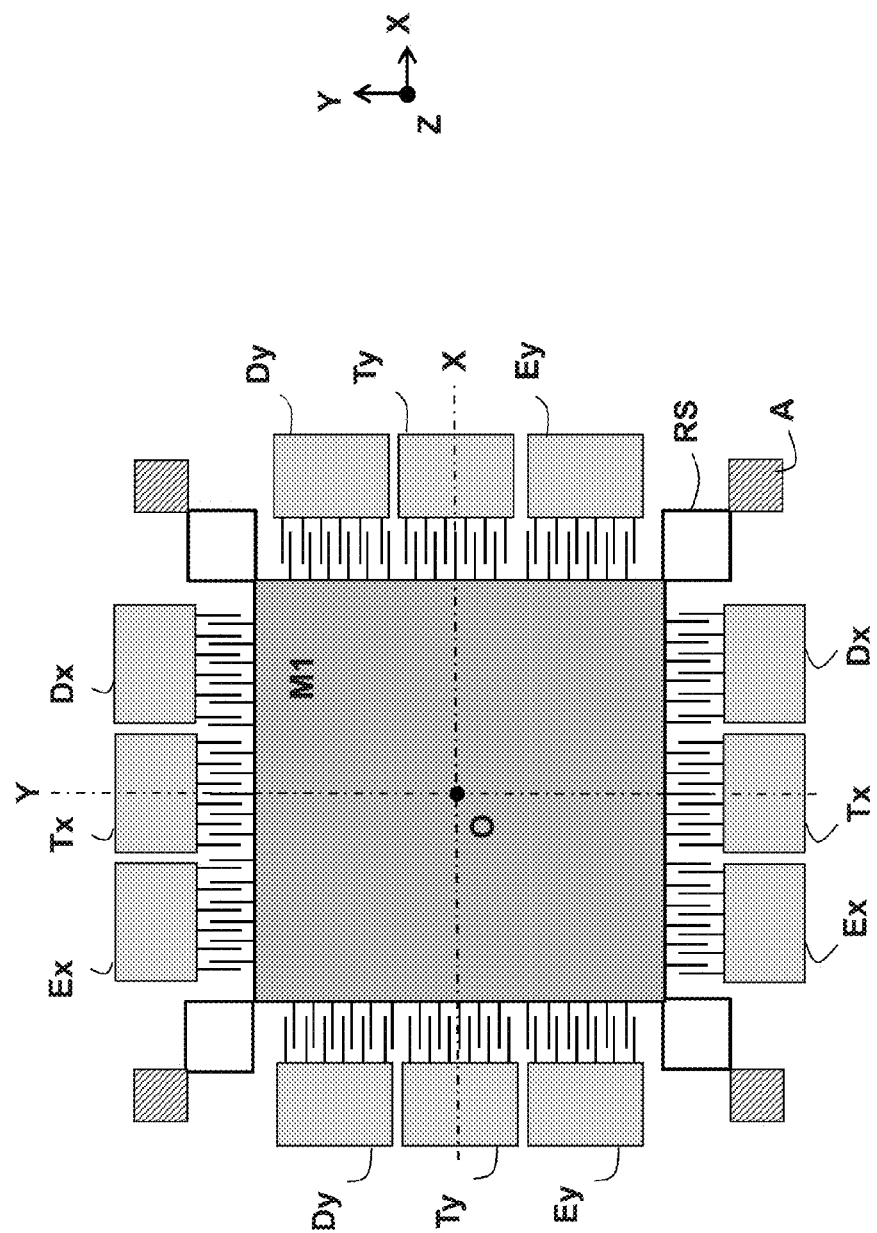

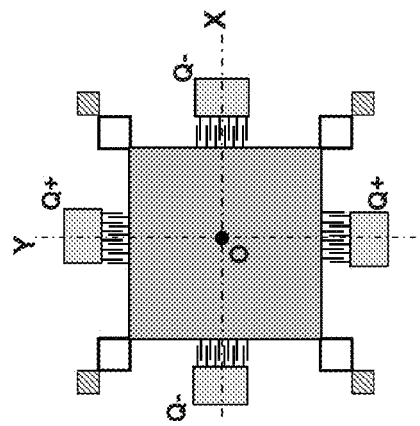
Fig. 14
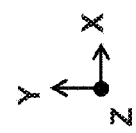
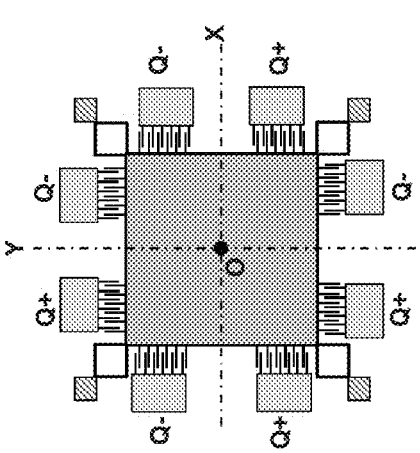
Fig. 13
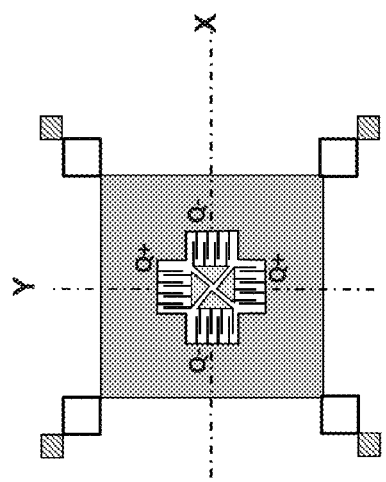
Fig. 15

MEMS ANGULAR INERTIAL SENSOR OPERATING IN TUNING FORK MODE

CROSS-REFERENCE TO RELATED APPLICATION

This application claims priority to foreign French patent application No. FR 1401451, filed on Jun. 27, 2014, the disclosure of which is incorporated by reference in its entirety.

FIELD OF THE INVENTION

The invention relates to a vibrating inertial sensor, micro-machined in a plane thin wafer, allowing the measurement of an angular position (gyroscope) or of an angular speed (gyrometer).

BACKGROUND

The fabrication of these micro-machined sensors, also called MEMS (Micro-Electro-Mechanical-Systems) sensors, uses techniques of collective micro-machining, etching, doping depositions, etc., similar to those which are used for the fabrication of electronic integrated circuits, allowing low production costs.

Such MEMS inertial sensors produced on a silicon or quartz wafer by micro-machining are already known. The structure is planar, in the plane of the silicon or quartz substrate in which it is etched.

These sensors consist of several vibrating mobile masses linked together and to their support by elastic elements in such a way as to constitute an excitation resonator, or primary resonator, and a detection resonator, or secondary resonator, the two resonators being coupled together by the Coriolis acceleration. These sensors have means of excitation, of detection, and often of balancing. In these sensors, the masses are generally excited in vibration in the plane XY of the wafer, perpendicularly to an axis Z, termed the "sensitive axis" of the gyrometer. When the gyrometer rotates about its sensitive axis, the composition of the forced vibration with the angular rotation vector produces, through the Coriolis effect, forces which set the mobile masses into natural vibration perpendicularly to the excitation vibration and to the sensitive axis; the amplitude of this natural vibration is proportional to the rotation speed. The natural vibration is detected by a detection transducer, whose electrical signals are utilized by an electronic circuit to deduce therefrom a value of the angular speed about the sensitive axis.

Various structures of MEMS vibrating inertial sensors are known which define the shapes and dispositions of the various elements of the structure. These various elements will typically be the vibrating elements, the mechanisms for suspending these elements, the coupling mechanisms; the excitation and detection electrostatic transducers allowing actual measurement and the electrostatic transducers allowing various balancings or compensations making it possible to improve the precision of the measurement.

These structures are devised to satisfy various constraints with regard to measurement precision and to low energy losses, while remaining within the domain of MEMS fabrication technologies.

The performance of such sensors may be degraded by the energy losses of the resonators to the exterior. To limit these energy losses, the excitation resonator of most gyrometers is balanced to first order by the use of two masses vibrating in phase opposition, like a tuning fork. The useful vibration mode in phase opposition is separated from the parasitic in-phase mode by virtue of a central elastic coupling element which introduces a stiffness between the two masses. An example of such a sensor is described in patent FR2846740. However, energy losses persist in such sensors, since the secondary resonator is not balanced by construction. Therefore, this mode transmits a torque to the support of the tuning fork, thereby rendering this mode sensitive to the conditions of fixing to the support and to the exterior disturbances transmitted by the support.

Tuning fork gyrometer structures comprising elastic means of coupling between the branches of the tuning fork are well known and described in the patent literature. In these structures, the vibrations of the masses in phase opposition are therefore utilized by separating the useful vibration mode from the parasitic modes. To improve the measurement precision, these structures propose various adjustment or compensation means, be it by construction and/or through the use of electrically controlled compensation or adjustment elements.

Structures with double tuning fork, using four masses, have also been proposed so as to compensate by construction the defects of balancing of the secondary resonator of the single tuning fork structure. Patents FR2859527 and FR2859528 give examples thereof.

Technical Problem

In these various structures, residual imperfections of balancing of the resonators persist, as well as parasitic couplings between the excitation mode and the detection mode, which may be due to the imbalances of the various elastic suspension and coupling means used.

SUMMARY OF THE INVENTION

The present invention proposes a sensor architecture with axisymmetric rigid mobile masses, that can be produced by collective micro-machining in a plane thin silicon (or quartz) wafer and operating in tuning fork mode. The architecture is balanced by construction and well isolated from its exterior environment. It can be supplemented with electrostatic compensation and balancing means allowing compensation for the production defects of the structure. It allows notably an excitation of the vibration in any direction of the plane perpendicular to the sensitive axis Z.

This architecture comprises two concentric mobile masses, which are suspended and coupled together by springs, and which vibrate in tuning fork mode, with no favoured axis in the plane XY of the wafer: the useful vibration mode corresponds to a linear vibration of the two masses in phase opposition either along an axis X or along an axis Y orthogonal to the axis X.

This architecture forms a resonant system with two suspended masses coupled together by elastic elements, which exhibits few parasitic vibration modes and which allows good separation between these modes and the useful vibration mode; a parasitic vibration mode would correspond for example to a linear vibration of the two masses in phase, at a frequency separated all the further from the frequency of the useful mode, the higher the stiffness of the coupling between the two masses.

Moreover, all the mechanical structures and the transducers of the sensor according to this architecture can be produced in a single active silicon layer, thereby allowing their fabrication with a single photolithography mask and just one etching step. This considerably limits the geometric imperfections and the parasitic mechanical stresses and this makes it possible to obtain a structure with few defects even before the application of compensations.

The invention thus relates to a micro-machined inertial angular sensor comprising at least two vibrating masses machined in a generally plane support wafer, mobile with respect to the wafer and mobile with respect to one another, suspended from fixed anchoring points of the wafer by suspension springs and coupled together by coupling springs so as to vibrate in phase opposition.

According to the invention, the sensor comprises:
at least one transducer for exciting a vibration motion of one of the masses along a direction X in the plane of the wafer, a transducer for exciting this mass along a direction Y perpendicular to the direction X and in the plane of the wafer, a transducer for detecting a vibration of one of the masses along the direction X and a transducer for detecting a vibration of one of the masses along the direction Y; the excitation transducers (Ex, Ey) and detection transducers (Dx, Dy) each comprise a pair of interdigitated combs having a mobile comb formed of a row of teeth fastened to the vibrating mass and a fixed comb formed of a row of teeth fastened to a fixed electrode, the interdigitation of the teeth at rest being dissymmetric,
at least one first frequency adjustment electrostatic transducer, as interdigitated combs with symmetric interdigitation at rest, able to apply an adjustable electrostatic stiffness to the vibrating mass along the direction X, and a second frequency adjustment electrostatic transducer similar to the first and able to apply to the vibrating mass an adjustable electrostatic stiffness along the direction Y,
the two mobile vibrating masses are disposed one around the other, as an inner mass and an outer mass, and their centres of gravity coincide at rest,
the coupling springs are each linked on one side to the inner mass and on the other to the outer mass and they have identical stiffnesses along the direction X and along the direction Y,
the stiffnesses of the springs for suspending the inner mass are identical along the direction X and along the direction Y and the stiffnesses of the springs for suspending the outer mass are identical along the direction X and along the direction Y, and they are proportional to the values of the respective masses,
the mobile assembly consisting of a vibrating mass and the parts of transducers fastened to this mass has a structure which is generally symmetric with respect to an axis of symmetry OX parallel to the direction X and passing through the centre of gravity of the mass, and also generally symmetric with respect to an axis of symmetry OY parallel to the direction Y and passing through the centre of gravity of the mass.

Particular cases where the generally symmetric structure is not 100% symmetric will be set forth later, these cases being related principally to the fact that certain auxiliary electrostatic transducers of the structure may be interdigitated combs with symmetric interdigitation at rest whilst the principal excitation and detection electrostatic transducers are preferably combs with dissymmetric interdigitation at rest. The tiny differences of symmetry which may result therefrom but which enter, however, within the framework of the general symmetry of the mobile assemblies of the invention will be explained later.

According to a particularly advantageous characteristic of the sensor, provision is preferably made for at least one of the vibrating masses to be coupled to at least one electrostatic transducer for compensating a positive quadrature bias (Q+) and at least one electrostatic transducer for compensating a negative quadrature bias (Q−), making it possible to modify the distribution of the stiffnesses acting on the vibrating mass so as to align the principal axes of dynamic stiffness with the axes of symmetry OX and OY.

The quadrature bias compensation electrostatic transducer or transducers are preferably arranged according to one of the following dispositions:
a pair of transducers acting in compensation of positive bias and in compensation of negative bias along the direction X and another pair acting in compensation of positive bias and in compensation of negative bias along the direction Y,
a pair of transducers acting respectively in positive and in negative, these transducers each comprising double combs having teeth oriented along the direction X and teeth oriented along the direction Y,
a transducer for compensating the positive bias acting along one of the directions X and Y, and a transducer for compensating the negative bias acting along the other direction orthogonal to the first.

Preferably still, the geographical disposition with respect to the axis of symmetry OX of the quadrature bias compensation transducers is identical, if their polarity of action is disregarded, to their geographical disposition with respect to the axis of symmetry OY.

The inner and outer vibrating masses preferably have equal mass values and the stiffnesses of the springs for suspending these masses are then identical.

Preferably, the geographical disposition, with respect to the axis of symmetry OX, of the excitation and detection transducers, and optionally also of the frequency adjustment transducers, working along the direction X is identical to the geographical disposition with respect to the axis OY of the transducers exercising the same functions but working along the direction Y.

Each of the transducers associated with a vibrating mass can be formed of two pairs of interdigitated combs disposed symmetrically with respect to the direction of action or of detection X or Y of the transducer, with one of the following configurations:
the transducer is divided into two transducers disposed on either side of the vibrating mass, that is to say that the two mobile combs are disposed symmetrically on either side of the vibrating mass and the two fixed combs are disposed on either side of the vibrating mass, also symmetrically except in the case of transducers for compensating a quadrature bias;
or else the teeth of the mobile combs are situated symmetrically on either side of a fixed electrode inside an aperture of the vibrating mass, the latter surrounding the pair of combs and the fixed electrode.

Preferably, each of the two mobile vibrating masses comprises excitation transducers, detection transducers, and optionally also frequency adjustment transducers and quadrature bias compensation transducers. Matters are then arranged such that the general configuration of the assembly of the mobile masses, and of the mobile combs associated with these masses, is globally symmetric with respect to the axis of symmetry OX and also with respect to the axis of symmetry OY, preferably according to a symmetry of order 4, that is to say an invariance of the configuration when the assembly is rotated by 90° about the axis OZ, this with the possible exception of minor dissymmetries due directly or indirectly to the fact that the frequency adjustment transducers have symmetric interdigitation at rest in contradistinction to the other transducers, and to the fact that the quadrature bias compensation transducers can have polarities of action which do not have a symmetry of order 4.

Provision may advantageously be made for the number of comb teeth of each type of transducer (excitation, or detection, or frequency adjustment, or quadrature bias compensation) to be identical on the two masses, this for each direction X and Y so as to optimize the similarity of the physical effects exerted on the two masses.

In a general manner, the mechanical characteristics and notably the distribution of the masses of the mobile assemblies (actual masses and mobile combs or mobile parts of the transducers which are fastened to the masses) and the stiffnesses of the suspension arms and the stiffnesses of the coupling arms are such that these mobile assemblies do not, by construction, have a favoured axis of vibration in the plane XY. The global symmetry of the mobile assemblies makes it possible to reduce the sensitivity of the sensor to disturbances which would induce static de-positionings of the mobile masses, for example stresses or static accelerations.

In a judicious configuration of the transducers (with interdigitated combs), for each mobile mass, provision is made that:
the direction of action or of detection of each electrostatic transducer is oriented parallel to the axis of symmetry OX or else parallel to the axis of symmetry OY;
the configuration of the teeth of the interdigitated combs of each transducer (at least for the excitation and detection combs) is symmetric with respect to an axis parallel to the axis of action or of detection of the transducer, that is to say parallel to the axis of symmetry X or to the axis of symmetry Y according to the case;
for each vibrating mass, the general disposition of the transducers with respect to the axis of symmetry OX is the same as the disposition of the transducers with respect to the axis of symmetry OY.

If there are transducers for compensating the quadrature bias, the similarity of disposition of the transducers about the axes X and Y is achieved either by disposing a pair of transducers with X-wise comb electrodes acting in positive and in negative and another pair with comb electrodes disposed Y-wise acting in positive and in negative, or by producing two transducers (for the positive quadrature bias and the negative quadrature bias respectively) with double combs having teeth oriented along the two directions X and Y, or finally by providing a transducer for compensating the positive quadrature bias disposed along one of the axes, X for example, and a transducer for compensating the negative quadrature bias disposed along the other axis, Y in this case.

Now turning to the similarity of disposition of the transducers on the two masses, inner and outer, provision is preferably made for each of the two masses to have at least one electrostatic excitation transducer for the direction X and another for the direction Y, an electrostatic detection transducer for the direction X and another for the direction Y, a frequency adjustment electrostatic transducer for the direction X and another for the direction Y, and preferably also at least one quadrature bias compensation transducer acting on the positive biases and a quadrature bias compensation transducer acting on the negative biases.

The excitation and detection transducers with dissymmetric interdigitation are preferably disposed on the inner vibrating mass and on the outer mass with an inverse sense of dissymmetry, either along the direction X or along the direction Y.

The transducers are of course associated with electronic circuits which allow their operation according to known principles.

Finally, in the particularly advantageous case where the sensor comprises phase quadrature bias compensation transducers, the invention advantageously proposes a method for compensating the anisotropy defects of the sensor which comprises the following successive steps:
a first step of precise alignment of the principal axes of dynamic stiffness of the mobile assembly with the directions X and Y, achieved by the adjusting of voltages applied to the quadrature bias compensation transducers,
and a second step of equalizing the resonant frequencies along the direction X and along the direction Y, achieved by the adjusting of voltages applied to the frequency adjustment transducers.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention.

Accordingly, the drawings and description thereof are to be regarded as illustrative in nature, and not as restrictive.

BRIEF DESCRIPTION OF THE DRAWINGS

FIG. 2 represents shapes of springs for suspending or coupling the masses;

FIG. 10 represents a possible disposition of the transducers at the periphery of a vibrating mass;

FIG. 13 represents a disposition in which the bias compensation transducers are situated at the periphery of the mass;

FIG. 14 and FIG. 15 represent other possible constructions of the bias compensation transducers;

DETAILED DESCRIPTION

The principles of fabrication of an MEMS inertial sensor are firstly briefly recalled: a thin silicon wafer is machined to make a gyrometer whose sensitive axis Z is perpendicular to the plane XY of the wafer and whose excitation and detection motions are situated in the plane of the wafer.

Silicon is chosen as preferential material, on the one hand for its mechanical properties and on the other hand for its high conductivity when it is sufficiently doped with an appropriate impurity (boron in general for silicon of type P). The conducting silicon makes it possible to carry out the electrical functions of the sensor, notably the electromechanical transduction functions which are generally carried out by electrodes as interdigitated capacitive combs energized with electrical current or voltage; the teeth of these combs, machined directly in the conducting silicon, serve as plate of capacitors useful for the excitation functions and for the detection functions.

The thickness of the silicon wafer is for example a few hundred micrometres, the wafer comprises on the one hand fixed anchoring zones formed in this thickness and on the other hand the actual vibrating structure, free with respect to the anchoring zones and formed on a smaller thickness, for example on a thickness of a few tens of micrometres, isolated from the remainder of the thickness of the wafer by a void interval. Over this thickness of a few tens of micrometres, the silicon wafer is cut by micro-machining according to the desired patterns of vibrating masses, of inter-mass coupling structures, of suspension springs and of interdigitated combs.

To simplify the explanations, the general principle of the vibrating inertial sensor according to the invention will now be described by turning firstly to the configuration of the vibrating masses, of the structures for suspending these masses with respect to the fixed-anchoring points, and of the structures for elastic coupling between these masses. The configuration of the various electrostatic excitation transducers which act on these masses and of the electrostatic detection transducers which detect their natural vibration will be explained thereafter. Next, the disposition of the frequency adjustment or bias compensation electrostatic transducers will be described. Finally, diverse complete possibilities of disposition of the transducers on the vibrating masses will be described.

Configuration of the Vibrating Masses

Figure 1:
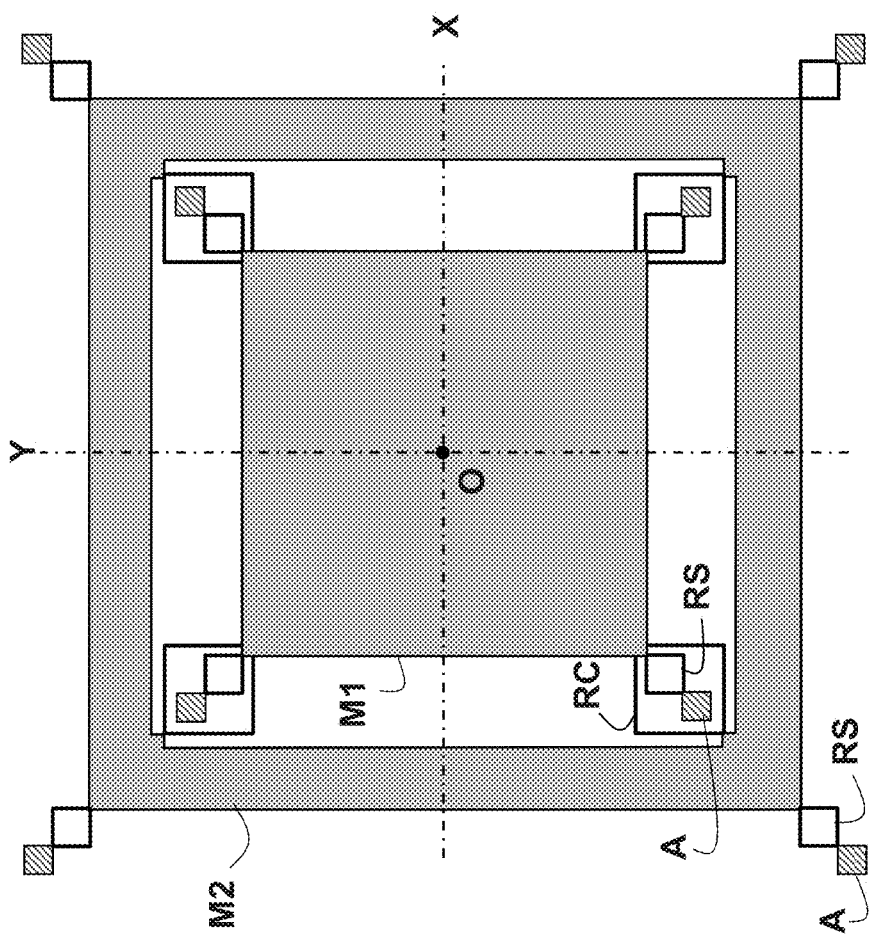
FIG. 1 represents the general principle of construction of the mechanical resonator according to the invention; the transducers are not represented.

The principle of the mechanical resonator according to the invention is schematically illustrated viewed from above in FIG. 1. It comprises two plane, concentric, mobile masses, M1 and M2, vibrating in tuning fork mode, that is to say in phase opposition, in their own plane. This plane XY is the plane of the figure.

OX and OY denote two orthogonal axes in the plane of the wafer and OZ denotes an axis perpendicular to the plane. The axes OX and OY constitute two axes of symmetry of the mass M1 as well as of the mass M2. A direction parallel to the axis OX will be called the direction X and a direction parallel to the axis OY will be called the direction Y.

The two masses are disposed one around the other as an inner mass M1 and an outer mass M2 and their centres of gravity coincide at rest. The centre of gravity referred to the plane of the drawing is designated by O in the figure.

The directions X and Y are the favoured directions of excitation of the vibration of the masses but a combined excitation is possible. Likewise, the directions X and Y are favoured directions of detection of the motions and they can be combined. This excitation and this detection are carried out in a known manner by electrostatic transducers with interdigitated combs, at least one of each type for each of the directions X and Y. In a well known manner, these interdigitated combs comprise a mobile comb fastened to the associated mobile mass and a fixed comb fastened to the substrate of the sensor. The teeth of the combs are perpendicular to the direction X or to the direction Y and thereby X-wise or Y-wise excitation or detection is favoured.

Each of the masses has a plane geometric shape which globally exhibits a symmetry of order 4 with respect to the axis OZ, that is to say that the general shape remains globally unchanged when the mass is rotated by 90°. Particular cases where a tiny dissymmetry of shape may persist will be returned to.

Each of the mobile masses is suspended by suspension springs RS from fixed-anchoring points A. The stiffnesses of the springs for suspending the inner mass are identical along the direction X and the direction Y, equal to a value denoted K1. The stiffnesses of the springs for suspending the outer mass are identical along the direction X and the direction Y equal to a value denoted K2. And the stiffnesses of the suspension springs are proportional to the respective values of mass m1 and m2 of the inner and outer masses M1 and M2, this being written: $K1/m1=K2/m2$. The masses m1 and m2 are, however, preferably equal and consequently the stiffnesses K1 and K2 too. Hereinafter, the stiffness of the suspension springs is denoted Ks.

The two masses are linked together by coupling springs RC, of equal stiffness Kc along the direction X and the direction Y. Each of these springs is fixed on one side to the inner mass and on the other to the outer mass.

The structure of the mobile assembly consisting of the inner and outer masses, of the orthotropic (identical in the directions X and Y) coupling and suspension springs, as well as the excitation and detection transducers according to each of the directions X and Y is a structure which is symmetric with respect to the axis of symmetry OX and also symmetric with respect to the axis of symmetry OY.

The identity (or isotropy) of stiffness of the suspension springs in the directions X and Y is achieved by providing that these springs each comprise at least two orthogonal arms of the same length forming an L having an end fastened to an anchoring point and an end fixed to the mobile mass. Likewise, for the coupling springs, the ends of the L being fastened to each of the mobile masses.

In FIG. 1, the springs RS and RC have been represented as each comprising two L-shaped structures starting from the same points, that is to say that each spring consists of the four branches of a square whose sides are parallel to the axes of symmetry OX and OY and two of whose opposite corners are fixed to a mass on one side and to an anchoring point or to the other mass on the other side. Four suspension springs RS disposed at the four corners of each mobile mass, and four coupling springs RC between masses, also at the four corners, are provided. The lengths of the sides of the L or of the squares are larger for the coupling springs than for the suspension springs, the stiffness Kc being a priori lower than the stiffness Ks.

FIG. 2 represents other possible shapes of suspension springs with identical stiffnesses along the direction X and along the direction Y. The desired stiffness is adjusted through the choice of the geometric dimensions of the springs: length, width, thickness and number of arms. Folded-back arms can offer a greater useful length and therefore a lower stiffness. Similar shapes are possible for the coupling springs.

In FIG. 1, the inner mass has been represented by a simple square and the outer mass by a frame which surrounds this square. If the masses must be identical, the stiffnesses of the suspension springs then being identical for the two masses, the surface areas occupied by the square and the frame in the plan view must be identical. In this example of FIG. 1, the points for anchoring the inner mass are situated between the inner mass and the outer mass and the coupling springs surround these anchoring points.

The suspension springs are advantageously placed at the corners of the squares so as to be as distant as possible from one another, in such a way as to limit the parasitic rotational motions. It would also be possible to place them anywhere else, provided that their function is not impaired and that the symmetry of order 4 remains complied with.

Figure 3:
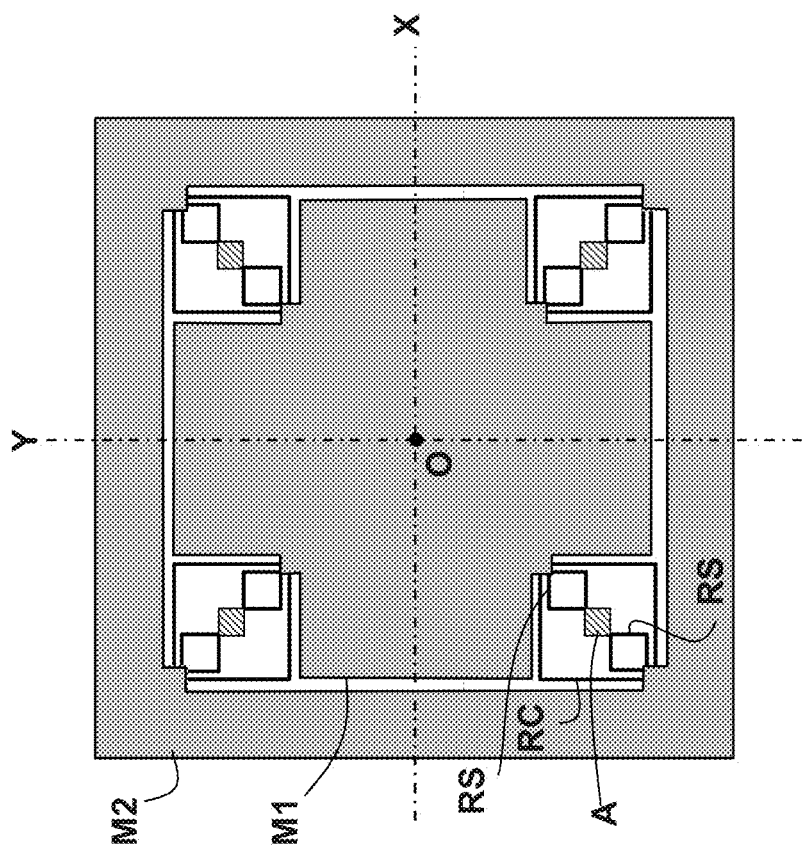
FIG. 3 represents a variant arrangement of the two vibrating masses.

FIG. 3 represents a variant in which: the anchoring points A for the inner mass coincide with the points for anchoring the outer mass; the springs for suspending the two masses are situated on either side of these anchoring points; the coupling springs RC surround the anchoring points and the suspension springs RS; the inner mass is constructed in the shape of a cross so as to best occupy the space available inside the outer mass while leaving space in the corners for the springs and for the anchoring points. It will be noted that the two reaction forces originating from the deformation of the suspension springs cancel out on each anchoring point.

Figure 4:
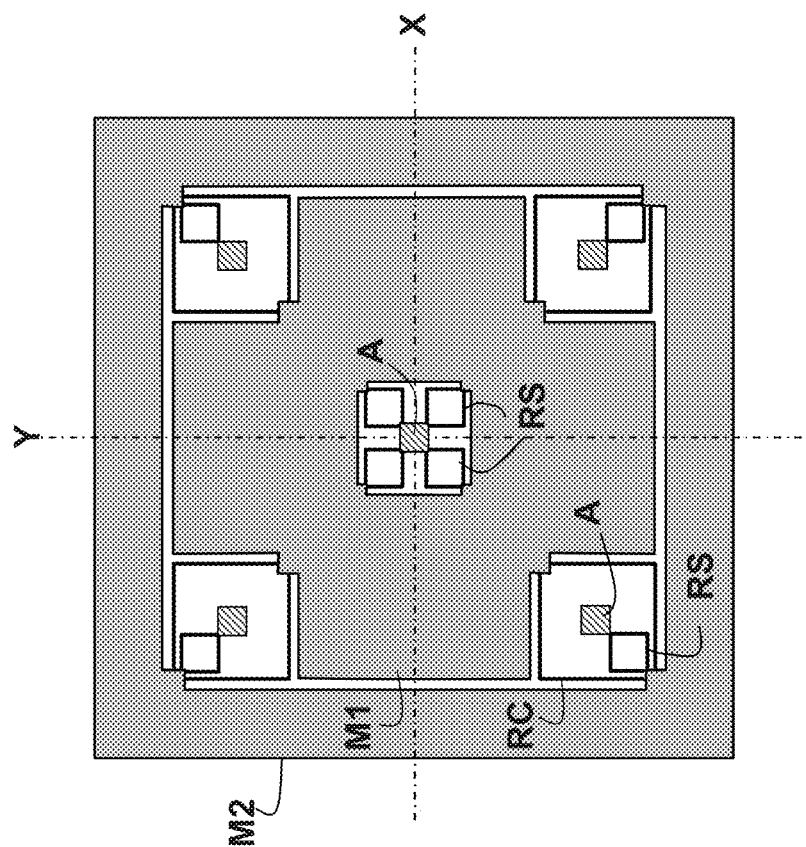
FIG. 4 and FIG. 5 represent other variants.

FIG. 4 represents another variant in which the four orthotropic suspension springs RS of the inner mass are disposed at the centre of the latter, in an aperture made for this purpose, and linked to the same anchoring point A. It is even possible to envisage having in this aperture four different anchoring points and an orthotropic suspension spring associated with each of them.

Figure 5:
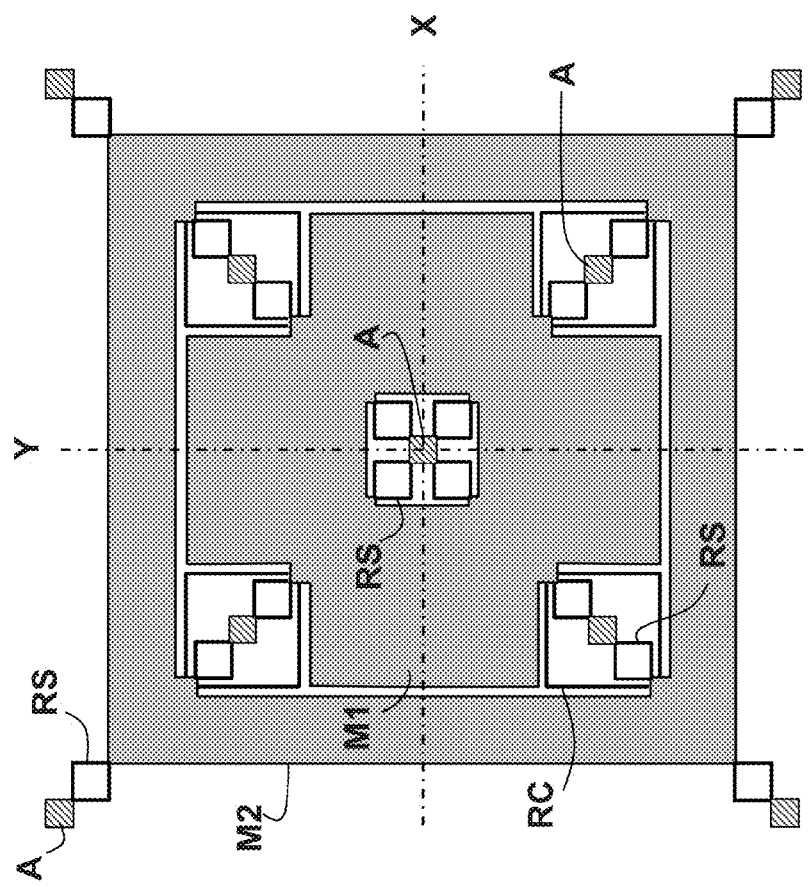

FIG. 5 represents another example intended to improve the mechanical robustness of the structure or to better separate the useful vibration mode (vibration of the masses in phase opposition) from the parasitic modes with rotation motions or motions outside the plane. In this example, there is a larger number of suspension springs (eight per mobile mass). However, the symmetry of order 4 remains complied with, that is to say that the general layout of the mobile assembly comprising the masses and the suspension and coupling springs remains invariant during a rotation of 90° about the axis OZ.

When the whole of the structure is thus rendered globally symmetric, with orthotropic suspensions (that is to say identical along the directions X and Y), the motions of the two coupled masses will be parallel (but in phase opposition) and it will be possible with the aid of appropriate transducers acting along the directions X and Y to sustain a forced vibration along any direction of the plane XY without any favoured axis, including a continuously variable direction, that is to say a precession motion; the vibration is isotropic in the plane XY.

A possible parasitic mode of vibration, in phase and not in phase opposition, may exist, but its frequency is all the further from the frequency of the useful vibration mode, the larger the stiffness of the coupling springs. The frequency of the useful mode is proportional to the square root of (Ks+2Kc) whereas the frequency of the parasitic mode is proportional to the square root of Ks, where Ks and Kc are the respective stiffnesses of the suspension and coupling springs.

To excite the useful vibration mode in any given direction of the plane, the excitation signal is decomposed into two components of adjusted respective amplitudes, applied respectively to the excitation transducers acting along the direction X and to the excitation transducers acting along the direction Y.

When the gyrometer rotates about its sensitive axis Z, the Coriolis effect produces forces which set the mobile masses into natural vibration perpendicularly to the excitation vibration and to the sensitive axis; the amplitude of this natural vibration is proportional to the rotation speed. The electronics associated with the sensor calculates the amplitude of the vibration along the direction orthogonal to the direction of excitation whatever the latter (known by assumption) by combining the information gathered by the detection transducers acting along the directions X and Y.

The sensor can operate in gyrometer mode: the direction of natural vibration is kept fixed with respect to the casing of the sensor by modifying the excitation and the output information is then an image of the necessary energy that must be applied to the excitation transducers in order to keep the direction of natural vibration fixed despite the motions of the casing. The sensor can also operate in gyroscope mode: the direction of the natural vibration is left free and is detected so as to give the angular orientation of the sensor.

Construction of the Transducers

The constructions of the transducers associated with the inner and outer mobile masses will now be described.

There are at least two excitation transducers associated with at least one of the two mobile masses (and preferably two transducers for each mobile mass), acting on this mass respectively along the direction X and along the direction Y. They will be called $E_X$ and $E_Y$. There are at least two detection transducers associated with at least one of the two mobile masses (and preferably two transducers for each mobile mass), detecting the motions of this mass along the directions X and Y and denoted $D_X$ and $D_Y$.

There is also on at least one mobile mass (and preferably on each of the two masses) at least one transducer for adjusting the frequency for each axis X and Y, denoted $T_x$ and $T_y$. They are able to apply an electrostatic stiffness (varying with the electrical voltage) to the mobile mass, which stiffness compensates for example for the inequalities, possibly detected on the axes X and Y, of mechanical stiffness of suspension springs.

Excitation and Detection Transducers

For good effectiveness, the transducers are preferably embodied by electrodes as interdigitated combs with gap variation. Each transducer comprises a pair of combs: there is a fixed comb PF whose teeth are fastened to a fixed electrode EF of the machined wafer and a mobile comb PM whose teeth, interdigitated with the teeth of the fixed comb, are fastened to the mobile mass associated with the transducer considered.

Excitation consists in applying an alternating voltage between the mobile comb and the fixed comb, at the desired frequency of vibration (mechanical resonant frequency of the suspended mobile mass). The motion produced is perpendicular to the teeth of the comb.

Detection consists in applying a polarization voltage between the fixed comb and the mobile comb and in observing the variations in charge which result from the variations in capacity between the fixed comb and the mobile comb due to the variations in spacing between the teeth of the fixed comb and of the mobile comb. The measured motion is the motion perpendicular to the teeth of the comb.

Figure 6:
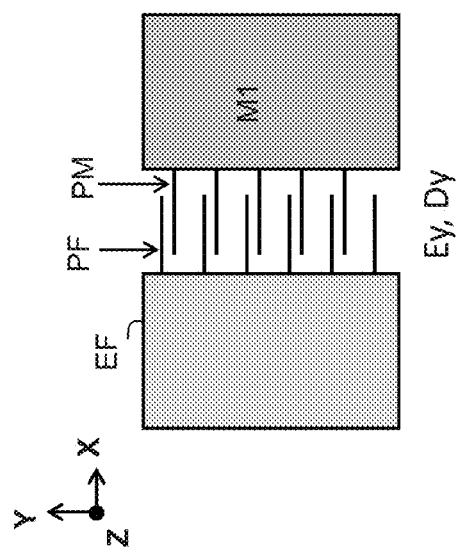
FIG. 6 represents the basic diagram, known, of a transducer with interdigitated combs with dissymmetric interdigitation.

For the detection and excitation transducers, the interdigitation of the combs is dissymmetric at rest, the teeth of the mobile comb PM are offset with respect to the middle of the interval between two teeth of the fixed comb PF, as represented schematically in FIG. 6 for transducers Ey or Dy.

Frequency Adjustment Transducer

A transducer for adjusting the frequency is useful for the following reason:

By virtue of the symmetry of the architecture according to the invention, by construction, the various mass-spring systems of the system have very close natural frequencies. However, the fabrication defects lead in reality to a structure which is not perfectly symmetric and orthotropic. This causes a degeneracy of the useful mode into two orthogonal modes oriented along two orthogonal axes dubbed the principal axes of dynamic stiffness. The modal characteristics (mass and stiffness) of these two modes are then slightly different and the dynamic stiffness of the vibrating system varies as a function of the angular position of the vibration. The behaviour of the system is no longer perfectly isotropic. It is therefore sought to compensate these dynamic stiffness anisotropy defects in the following manner: a compensation operation is carried out which consists initially in orienting the vibration along the principal stiffness axes, thereafter in measuring the disparity in resonant frequency of the two modes, and then equalizing the resonant frequencies of each mode by means of an adjustable electrostatic stiffness. This electrostatic stiffness is delivered by transducers for adjusting the frequency ("frequency trimming") acting along the directions X and Y.

When the compensation operation is carried out, the orthogonal modes, that may be called the excitation mode and the detection mode, are identical, orthogonal and of equal natural frequencies.

The frequency adjustment transducers also make it possible to compensate for the dissymmetries of dynamic stiffness between the two branches of the tuning fork: the two branches of the resonator may exhibit mass and stiffness disparities due to the geometric production defects. In the presence of these defects, the tuning fork motion is no longer perfectly balanced and renders the resonator slightly sensitive to its exterior environment.

If stiffness adjustment electrostatic transducers are available on each of the two branches of the tuning fork in the two directions X and Y, it is then possible to compensate these dissymmetries of dynamic stiffness of the system.

The compensations of defects can be performed in the factory or during use on condition that suitable electronic means are available, that is to say a possibility of slaving the disparities between the frequencies to zero. It is thus possible to compensate the effects of the temporal alterations of the physical properties of the resonant system that are caused by ageing or by thermomechanical effects.

Figure 7:
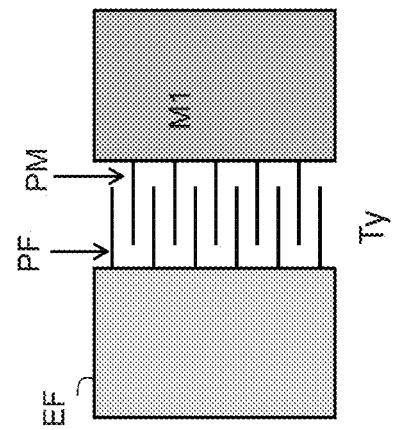
FIG. 7 represents the basic diagram of a frequency adjustment transducer with combs with symmetric interdigitation.

For the transducers for adjusting the frequency, consisting of a pair of interdigitated combs, the interdigitation of the combs is symmetric at rest, that is to say that, the teeth of the mobile comb PM are in the middle of the interval between two teeth of the fixed comb PF, as represented schematically in FIG. 7 for a transducer Ty.

Quadrature Bias Compensation Transducers

To compensate the anisotropy defects of dynamic stiffness of the assembly of two vibrating masses, it is optionally possible to use additional electrostatic transducers, which are called quadrature bias compensation transducers. They make it possible to apply stiffness forces, tending to align exactly (in the case of slight misalignment) the principal axes of dynamic stiffness of the mobile assembly with the directions X and Y of the axes of symmetry of the assembly.

They are used in the following manner, in combination with the frequency adjustment transducers: precise alignment of the stiffness axes with the directions X and Y is performed firstly, the frequency disparity between the vibration frequencies of the two orthogonal modes is measured, and then the resonant frequencies of each mode are equalized by acting on the frequency adjustment transducers. When these compensation operations are carried out, the orthogonal modes, which may be called the excitation mode and the detection mode, are identical, orthogonal and of equal natural frequencies.

Figure 21:
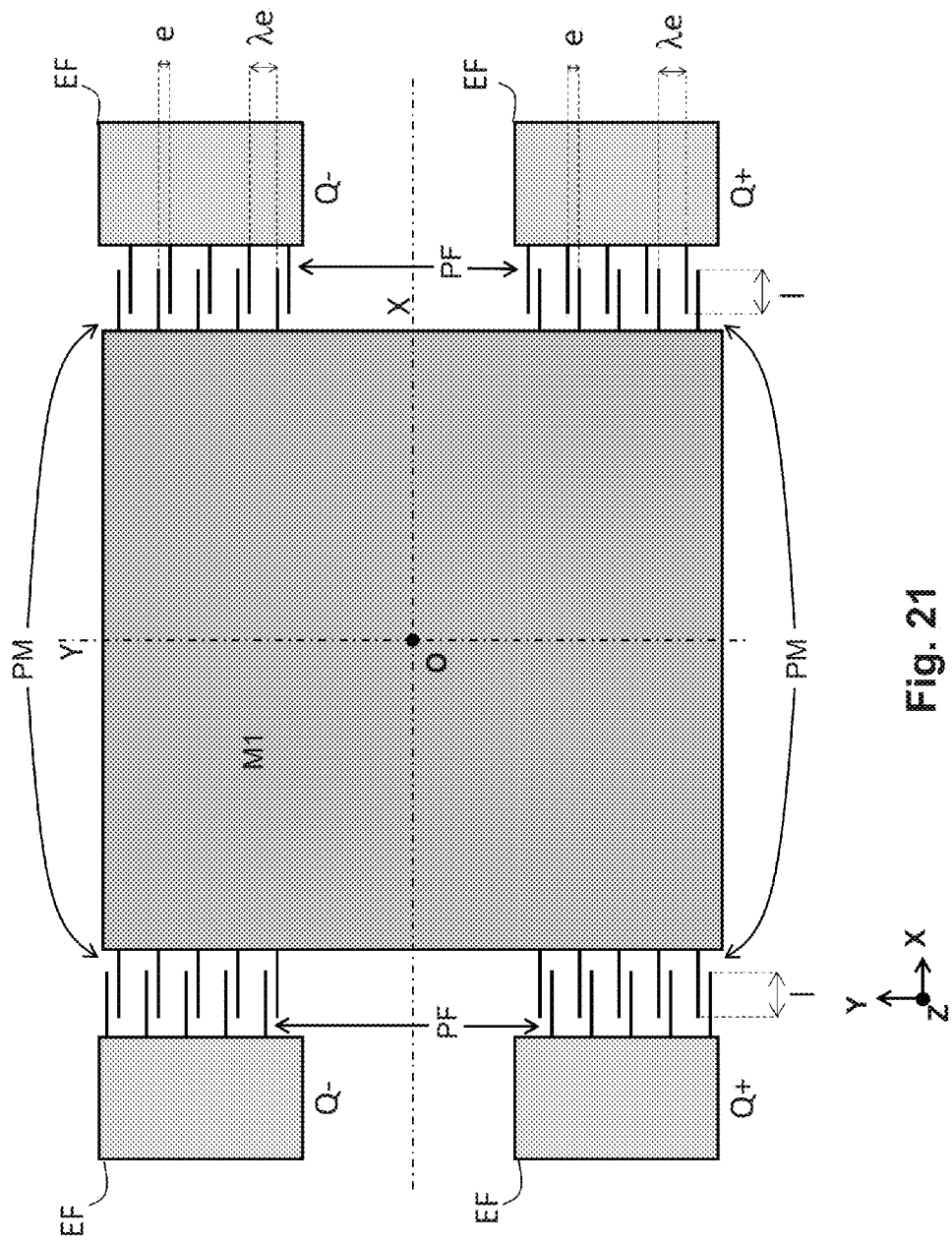
FIG. 21 highlights aspects of constructions and dispositions of positive and negative quadrature bias compensation transducers.

The transducers for compensating the quadrature bias Q+ and Q− are also transducers with interdigitated combs. FIG. 21 shows an example of transducers Q+ and Q−| having their comb electrodes disposed along the direction Y. The interdigitation of the combs is dissymmetric at rest, the fingers of one half-comb not being exactly in the middle of the interval between two fingers of the other half-comb; at rest there are dissymmetric gaps e and λe, λ being a positive real number.

The stiffness terms created by one of the combs of such a transducer Q+ are the following:

stiffness along the direction X: $k_{xq}=0$
stiffness along the direction Y:

$$k_{yq} = n \cdot \varepsilon \cdot V^2 \frac{h \cdot l}{e^3} \left(1 + \frac{1}{\lambda^3}\right)$$

coupling stiffness $k_{xyq}$ between the axis X and the axis Y:

$$k_{xyq} = \frac{n \cdot \varepsilon \cdot V^2}{2} \frac{h}{e^3} \left(1 - \frac{1}{\lambda^2}\right)$$

where the index q signifies that the stiffness term is caused by the comb for compensating the quadrature bias,
N being the number of teeth per half-comb, h the thickness of the comb which is also the thickness of the silicon wafer, l the overlap length, V the DC voltage between each comb and ε the permittivity in vacuo.

In the example of FIG. 21, as the quadrature bias to be compensated can have any sign, another comb Q−, symmetric with the comb Q+ with respect to the axis of symmetry OX, is provided so as to create a negative stiffness term $k_{xyq}$. It is then seen that the electrodes with combs fastened to the vibrating mass are symmetric with respect to the axis of symmetry OY and with respect to the axis of symmetry OX, whereas the combs fastened to the fixed electrodes are symmetric only with respect to OX.

As a function of the sign of the quadrature bias to be compensated, either the positive quadrature bias compensation transducers Q+ receive an adjustable DC voltage $V_{Q+}$, or the negative quadrature bias compensation transducers Q− receive an adjustable DC voltage $V_{Q-}$. The electrostatic forces created by these voltages act so as to introduce a stiffness $k_{xyq}$ for coupling between the motion of the mass along the axis X and the motion of the mass along the axis Y, whose expression for the assembly of comb electrodes represented in FIG. 21 is:

$$k_{xyq} = \frac{n \cdot \varepsilon \cdot h}{e^3}\left(1 - \frac{1}{\lambda^2}\right)(V_{Q+}^2 - V_{Q-}^2)$$

The values of the voltages $V_{Q+}$ and $V_{Q-}$ are adjusted so as to obtain a coupling stiffness $k_{xyq}$ which modifies the stiffness distribution acting on the resonator so as to exactly align the principal axes of dynamic stiffness of the mobile assembly with the axes of symmetry OX and OY of the assembly.

For a displacement δy along the direction Y, the coupling stiffness force exerted in the direction X is $F_{xq}=k_{xyq}\cdot\delta y$. This force changes sign with δy. It will therefore be of opposite sign for the inner vibrating mass and for the outer vibrating mass when these two masses are in motion according to the useful vibration mode in phase opposition. This is why the transducers for compensating the quadrature bias will preferably be disposed on the inner vibrating mass and on the outer mass with dissymmetries of interdigitation of combs of like sense, either along the direction X or along the direction Y.

Moreover, on principle, the coupling stiffness is common to the two axes X and Y. It therefore suffices to have a pair of transducers Q+ and Q− having a series of teeth aligned along one of the directions X or Y so as to be able to compensate respectively a positive quadrature bias and a negative quadrature bias. Nonetheless, a transducer of positive action and a transducer of negative action will preferably be provided along each direction X and Y, disposed in such a way as to optimize the similarity between the distribution of the forces and mobile masses with respect to the axis of symmetry X and with respect to the axis of symmetry Y, doing so in order to improve the isotropy of the vibration in the plane XY.

Configuration of the Transducers with Respect to the Vibrating Masses

A configuration of the transducers which is compatible with an architecture of the resonator with no favoured axis, that is to say which does not disturb the isotropy of the vibration in all directions of the plane XY, is provided according to the invention. The configuration introduces the minimum of couplings and of dissymmetries of mass, of stiffness, or of applied force, whatever the direction of the vibration, so as to disturb the isotropy and the equilibrium of the resonant system as little as possible.

Firstly, for each electrostatic transducer, the action or detection axis is oriented either along the direction X, or along the direction Y and the teeth of the combs are configured to act or detect along a single of these two directions, that is to say they are placed perpendicularly to this direction.

Accordingly, one of the following two configurations of comb electrodes is employed, for which the comb electrodes of an electrostatic transducer are configured in a symmetric manner about their action or detection axis.

Each transducer is split into two pairs of interdigitated combs symmetric with respect to the action or detection axis X or Y, each pair comprising a fixed comb and a mobile comb.

Figure 8:
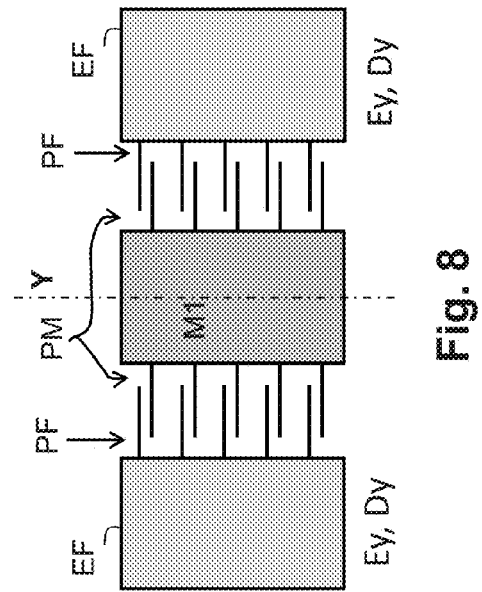
FIG. 8 represents a symmetric disposition of a dual transducer composed of two opposite transducers at the periphery of a vibrating mass.

According to a first configuration, represented in FIG. 8, the two pairs are disposed symmetrically on either side of the vibrating mass, outside the latter. The mobile combs PM are situated outside the mass on two opposite sides of the latter, and the fixed combs PF are situated on either side of the mobile combs, each fastened to a respective fixed electrode EF.

Figure 9:
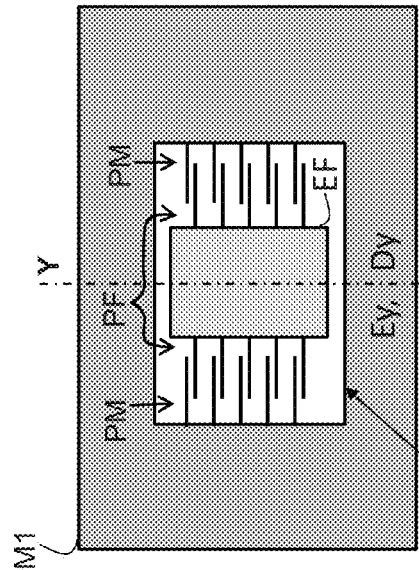
FIG. 9 represents a symmetric disposition of a transducer in an aperture of a vibrating mass.

According to a second configuration, represented in FIG. 9, the two pairs of combs of the transducer are symmetrically juxtaposed inside an aperture W formed in the mobile mass. The two pairs, as well as a common fixed electrode EF, are therefore surrounded by the mobile mass. The first pair is situated on one side of the fixed electrode, the second is situated on the other side, symmetric with respect to a straight line oriented in the direction X or Y. This second configuration has the advantage of reducing the number of fixed electrodes to be connected to the electronic circuit.

With these symmetric electrode configurations, a mass motion directed along the direction orthogonal to the direction of excitation or of detection will not modify the surface area of the combs facing one another, by differential effect. Therefore, to first order it will have no parasitic effect on the response of the transducers.

Thus, the transducers are insensitive to the motions orthogonal to their direction of action or of detection, thereby also rendering them insensitive in this direction to the static de-positionings induced for example by static accelerations or by exterior stresses exerted on the sensor.

The excitation transducers Ex, Ey apply static and dynamic electrostatic forces to the vibrating mass with which they are associated, respectively in the directions X and Y. Moreover, the detection transducers Dx, Dy and the transducers for adjusting the frequency Tx, Ty (and also the bias compensation transducers Q+ and Q− to which we shall return later) can be polarized by a DC voltage and therefore may apply static forces to the vibrating mass with which they are associated.

For each type of transducer and each direction X and Y, the combs are preferably produced so as to be disposed symmetrically with respect to the axis of symmetry OX or OY of the suspended mass with which it is associated. The expression "symmetrically disposed combs" is understood to mean that the disposition of the teeth of mobile combs is symmetric with respect to OX or OY. On account of the dissymmetric interdigitation of the combs of the excitation and detection transducers (and also of the bias compensation transducers Q), this can lead to placing the fixed combs in a slightly dissymmetric manner, this not being problematic.

In practice, this characteristic leads either to the centring of a single transducer on an axis of symmetry OX or OY of the mobile masses, or to the splitting of the transducer into two half-transducers disposed symmetrically with respect to this axis of symmetry OX or OY.

The resultant of the forces applied by the transducers passes through the centre of inertia O of the suspended mass, thereby making it possible not to excite the parasitic modes with rotation motions; and the geometry of the mobile combs which is thus produced makes it possible to limit to the maximum the imbalances of the mass about the axes of symmetry X and Y.

Geographical Organization with Respect to the Axes of Symmetry

Preferably, according to the invention, for each mobile mass, the geographical disposition with respect to the axis of symmetry OX of the transducers of the various types working along the direction X (excitation or detection, but preferably also frequency adjustment and quadrature bias compensation) is the same as the disposition about the axis of symmetry OY of the transducers working along the direction Y; and vice versa the disposition with respect to the axis of symmetry OX of the transducers working along the direction Y is the same as the disposition with respect to the axis OY of the transducers working along the direction X.

FIG. 10 represents such a configuration for the inner mobile mass M1.

There are:
- two transducers Ex for exciting a motion along the direction X, disposed symmetrically with respect to the general axis of symmetry OX of the mass,
- two transducers Ey for exciting a motion along the direction Y, disposed symmetrically with respect to the general axis of symmetry OY of the mass,
- two transducers Dx for detecting a motion along the direction X, disposed symmetrically with respect to the general axis of symmetry OX of the mass,
- two transducers Dy for detecting a motion along the direction Y, disposed symmetrically with respect to the general axis of symmetry Y of the mass,
- two frequency adjustment transducers Tx (with symmetric interdigitation) disposed symmetrically with respect to the axis OX, acting along the direction X, and moreover centred on the axis OY,
- two frequency adjustment transducers Ty (with symmetric interdigitation) acting along the direction Y, disposed symmetrically with respect to the axis OY and moreover centred on the axis OX.

Only the transducers Tx and Ty have a symmetric interdigitation at rest. The others all have dissymmetric interdigitation at rest.

These transducers are all disposed outside the mobile mass. The configuration could be the same for the outer mobile mass M2 not represented in FIG. 10.

Figure 11:
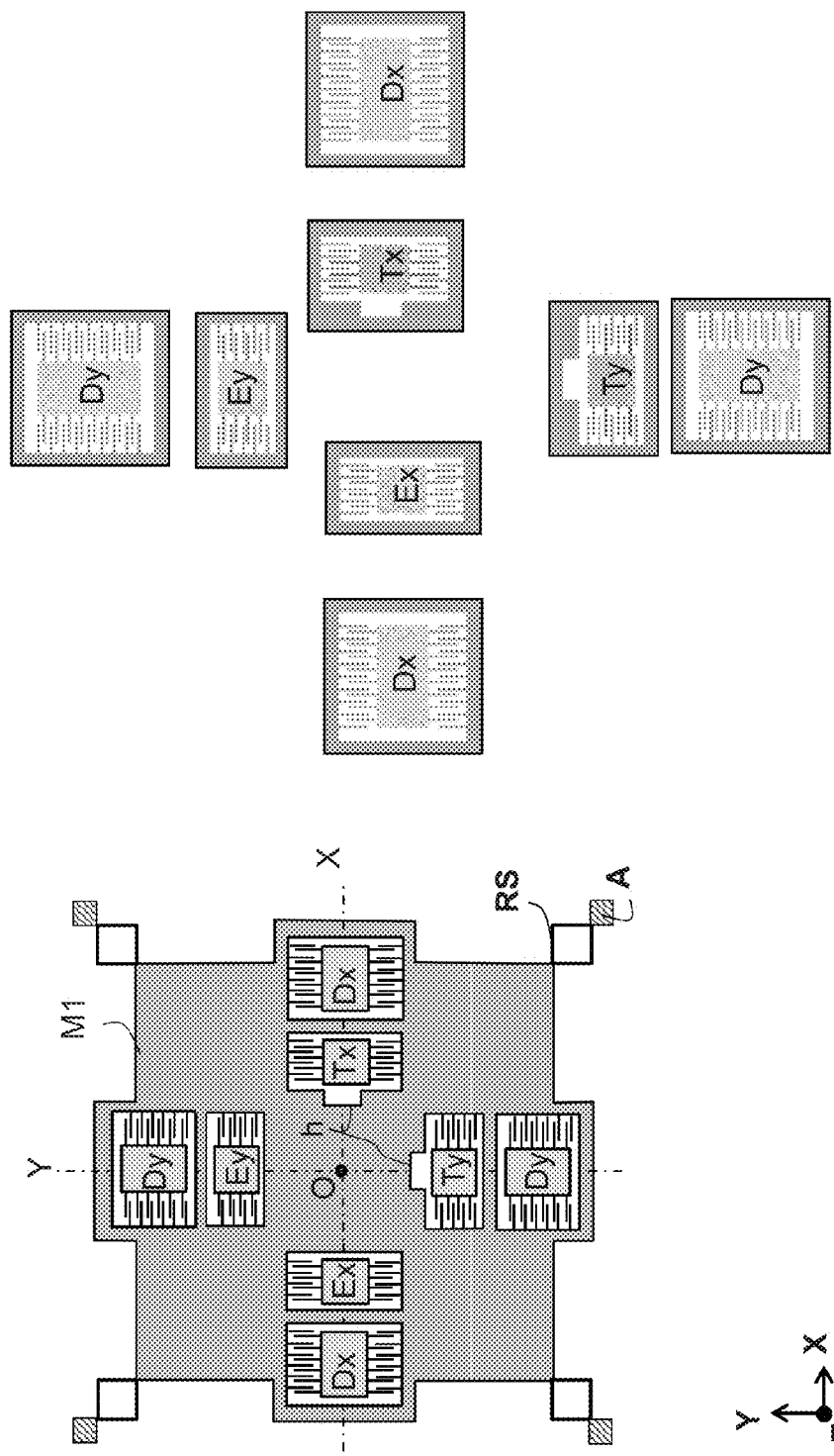
FIG. 11 represents another configuration where the transducers are placed in apertures of the vibrating mass.

FIG. 11 represents another general configuration of the inner mobile mass M1. In this configuration, all the transducers are placed in apertures of the mass and not at the periphery of the latter. In this case, they may all be placed on the axis of symmetry OX or OY respectively.

This example makes it possible to show moreover a particular feature of possible minor exception to the general mechanical symmetry of the mobile mass with respect to the axis OX and the axis OY: indeed, there is only one excitation transducer acting along the direction X and one excitation transducer acting along the direction Y. The transducer Ex along the direction X is placed symmetrically on the axis OX. But it is not on the axis OY. The transducer Ey acting along the direction Y is placed symmetrically on the axis OY but it cannot also be on the axis OX. Consequently, instead of constructing the mechanical symmetry of the mobile assembly by using two transducers Ex placed symmetrically with respect to the axis OY, the transducer Tx is placed in a position symmetric with the transducer Ex; likewise the transducer Ty is placed in a position symmetric with the transducer Ey. If these transducers have exactly the same number of mobile-comb teeth and the same dimensions of teeth and intervals between teeth, then the symmetry of the mobile assembly is complied with 100%. But if there are differences, the global symmetry remains complied with but not entirely 100%.

It is possible for example that the transducer Tx has a different number of mobile-comb teeth from that of the transducer Ex. These teeth have symmetric and not dissymmetric interdigitation; they can therefore be closer together and can be more numerous for this reason. If this results in an additional mass on the right side (the transducer Tx is on the right side), this risks creating an unbalance on the right side and this unbalance can be compensated by making a small additional aperture h in the mobile mass in proximity to the transducer Tx without providing such an aperture in proximity to the transducer Ex. This is shown by FIG. 11. The same thing is valid for the symmetry constructed between the transducer Ty and the transducer Ey. The devices having this type of minor symmetry difference enter within the framework of the present invention.

It will be noted that it is possible to envisage configurations of transducers some of which are placed in apertures of the mass and others of which are placed at the periphery of the mass, these latter then being disposed symmetrically with respect to the axis of symmetry OX or OY which is parallel to their direction of action X or Y. In all cases, provision is preferably made for the disposition of the transducers distributed about the axis of symmetry OX to be similar to the disposition of the transducers distributed about the axis OY. Thus, for example in FIG. 10, around the axis OX there are: two transducers Ty centred on the axis OX, on either side of the mass, a transducer Dy and a transducer Ey on either side of a transducer Ty, and the same thing on either side of the other transducer Ty, and three transducers Ex, Tx, Dx disposed on each side of the mass symmetrically with respect to the axis OX; reciprocally, around the axis OY with exactly the same distribution there are: two transducers Tx centred on the axis OY, on either side of the mass, a transducer Dx and a transducer Ex on either side of a transducer Tx, and the same thing on either side of the other transducer Tx, and three transducers Ey, Ty, Dy disposed on each side of the mass symmetrically with respect to the axis OY.

For FIG. 11, we have the same thing: with respect to the axis OX, on the axis OX there are successively a transducer Dx, a transducer Ex, a transducer Tx, a transducer Dx; reciprocally, on the axis OY there are successively and with exactly the same disposition a transducer Dy, a transducer Ey, a transducer Ty, a transducer Dy.

Transducers for Compensating the Quadrature Bias

To compensate the quadrature bias, which results from the fact that the directions of excitation and of detection are not aligned with the principal axes of dynamic stiffness, it would be possible to choose directions of excitation and of detection oriented along the principal axes of dynamic stiffness (which may be slightly misaligned with respect to the axes of symmetry OX and OY before compensation), by acting simultaneously on the transducers of the axes X and Y. But such a solution complicates the gyrometer control electronics since the reference frame (defined by the axes X and Y of sensitivity or of action of the transducers) in which the electronic control of the vibration modes is done, does not coincide with that (defined by the principal axes of dynamic stiffness) of the vibration modes.

A preferable solution consists in rotating the reference frame defined by the principal axes of dynamic stiffness so as to align it with the reference frame of the axes X and Y in which the electronic control is done.

The architecture according to the invention is compatible with such a solution. Accordingly, at least one pair of electrostatic transducers with interdigitated combs with dissymmetric interdigitations Q+ and Q− is added, they being capable of applying adjustable electrostatic coupling stiffnesses between the motions along X and along Y of the mass with which they are associated, respectively to compensate a positive quadrature bias and to compensate a negative quadrature bias. The design of the electrodes of the transducers Q+ and Q− is therefore done in such a way as to comply with the characteristics of geometrical symmetry of the mobile masses with respect to the axis OX and with respect to the axis OY.

The method for compensating the quadrature bias by electrostatic stiffnesses can be carried out during a step of tailoring the gyrometer at the end of fabrication, so as to correct the intrinsic quadrature bias. It is also possible to apply this method in a continuous manner, by putting in place in the electronic circuit a slaving to zero of the quadrature biases, thereby making it possible to compensate the effects of the temporal alterations of the physical properties of the resonant system that are caused by ageing or by thermomechanical effects.

The operation of compensating the quadrature bias will be carried out preferably for each of the masses of the gyrometer independently, that is to say that each of the vibrating masses will have at least one pair of transducers Q+ and Q−. The interdigitation of the combs of the transducer Q+ is such that the application of a drive voltage introduces a stiffness $k_{xyq}$ for coupling between the motion of the mass along the axis X and the motion of the mass along the axis Y, whereas for the same voltage, the interdigitation of the combs of the transducer Q− applies a coupling stiffness of opposite sign.

Figure 12:
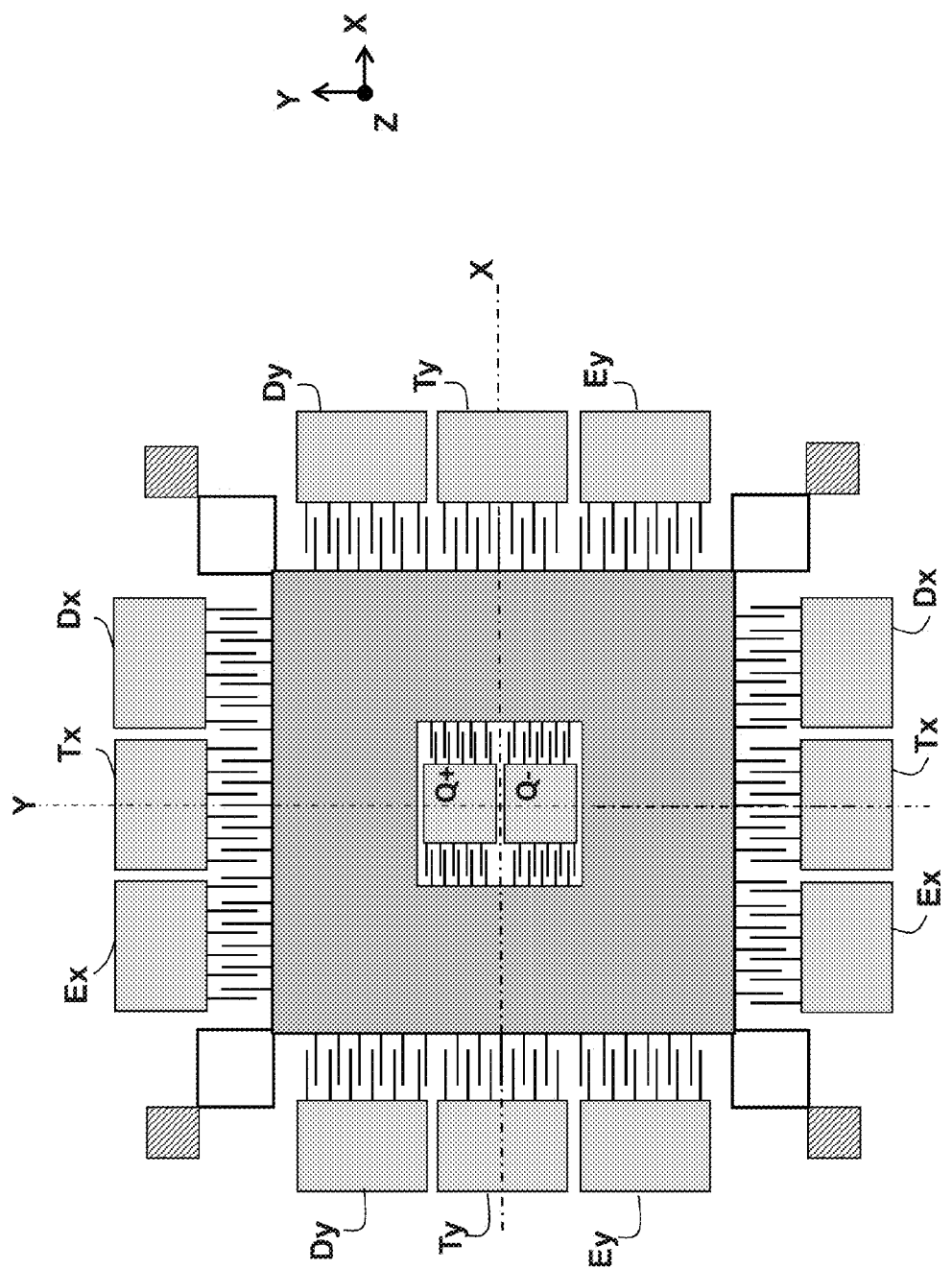
FIG. 12 represents a disposition in which quadrature bias compensation transducers are provided in an aperture of the vibrating mass.

On principle the coupling stiffness is common to the two axes X and Y, it therefore suffices to have a pair of transducers Q+ and Q− acting along one of the directions X or Y in order to be able to compensate the quadrature bias, for example as illustrated in FIG. 12.

In FIG. 12, the two compensation transducers Q+ and Q− have comb electrodes disposed along the direction Y. They act along the direction Y for a displacement along the direction X and vice versa they act along the direction X for a displacement along the direction Y. Here they are placed in an aperture of the mass.

Nonetheless, in this case the mobile electrodes of the transducers Q+ and Q− may introduce a difference into the distribution of the mass about the axis of symmetry X, with respect to the distribution of the mass about the axis of symmetry Y, thereby reducing the isotropy of the vibration in the plane XY.

To optimize the symmetry of the architecture and therefore its equilibrium by construction, according to the invention, the similarity of the disposition of the electrodes Q+ and Q− between the two axes of symmetry is optimized through one of the following configurations:

As indicated in FIG. 13, there are disposed two symmetric pairs of transducers Q+ and Q− (with however an inversion of the dissymmetry of the interdigitations of combs) disposed along the direction X and two other pairs of transducers Q+ and Q− disposed along the direction Y (where the other types of electrodes are not represented). The combs of the transducers Q+ disposed along the direction X and along the direction Y simultaneously compensate the positive quadrature biases, while the combs of the transducers Q− disposed along the direction X and along the direction Y simultaneously compensate the negative quadrature biases.

Alternatively, it is possible as in the example of FIG. 14 to dispose the electrodes Q+ along one axis of symmetry of the vibrating mass (one on each side of the vibrating mass) and the electrodes Q− along the other axis of symmetry of the vibrating mass, the transducers Q+ then being disposed along a direction perpendicular to the transducers Q−.

It is also possible to adopt a similar configuration, but inside the mass and not at the periphery, such as for example illustrated in FIG. 15.

Figure 16:
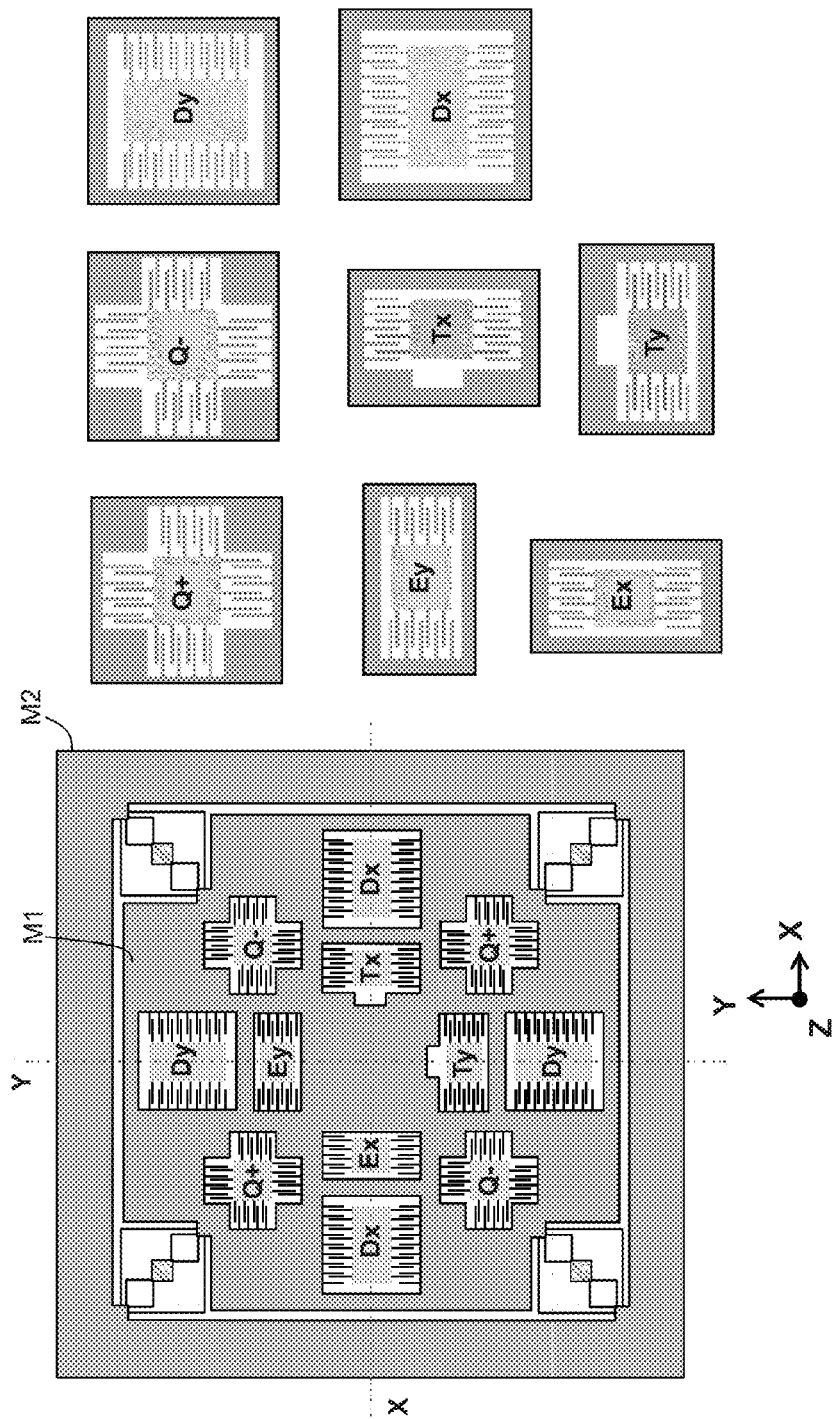
FIG. 16 represents a complete configuration of the vibrating masses with their transducers, only the inner mass being associated with transducers.

FIG. 16 represents an exemplary complete configuration in which only the inner mobile mass comprises transducers, the outer mobile mass M2 not comprising any. In this example, all the transducers are placed in apertures of the mobile mass. The excitation transducers Ex, Ey and detection transducers Dx, Dy are constructed as in FIG. 9 (fixed dual-comb associated with one and the same fixed electrode); the frequency adjustment transducers are constructed as in FIG. 11 (with optionally a compensation aperture); the bias compensation transducers are of the type represented in FIG. 15, and there are thereof four in this example, disposed symmetrically (a transducer Q+ symmetric with a transducer Q−) with respect to the axis OX and also with respect to the axis OY to ensure global mechanical symmetry of the assembly; the frequency adjustment transducers are placed as in FIG. 11, that is to say that they form the counterpart of the excitation transducers Ex and Ey and that they are optionally associated with a small aperture for compensating unbalance in the case where their mobile combs are not exactly the same as the excitation mobile combs. Finally, the suspension and coupling springs are disposed in this example as in FIG. 3.

Figure 17:
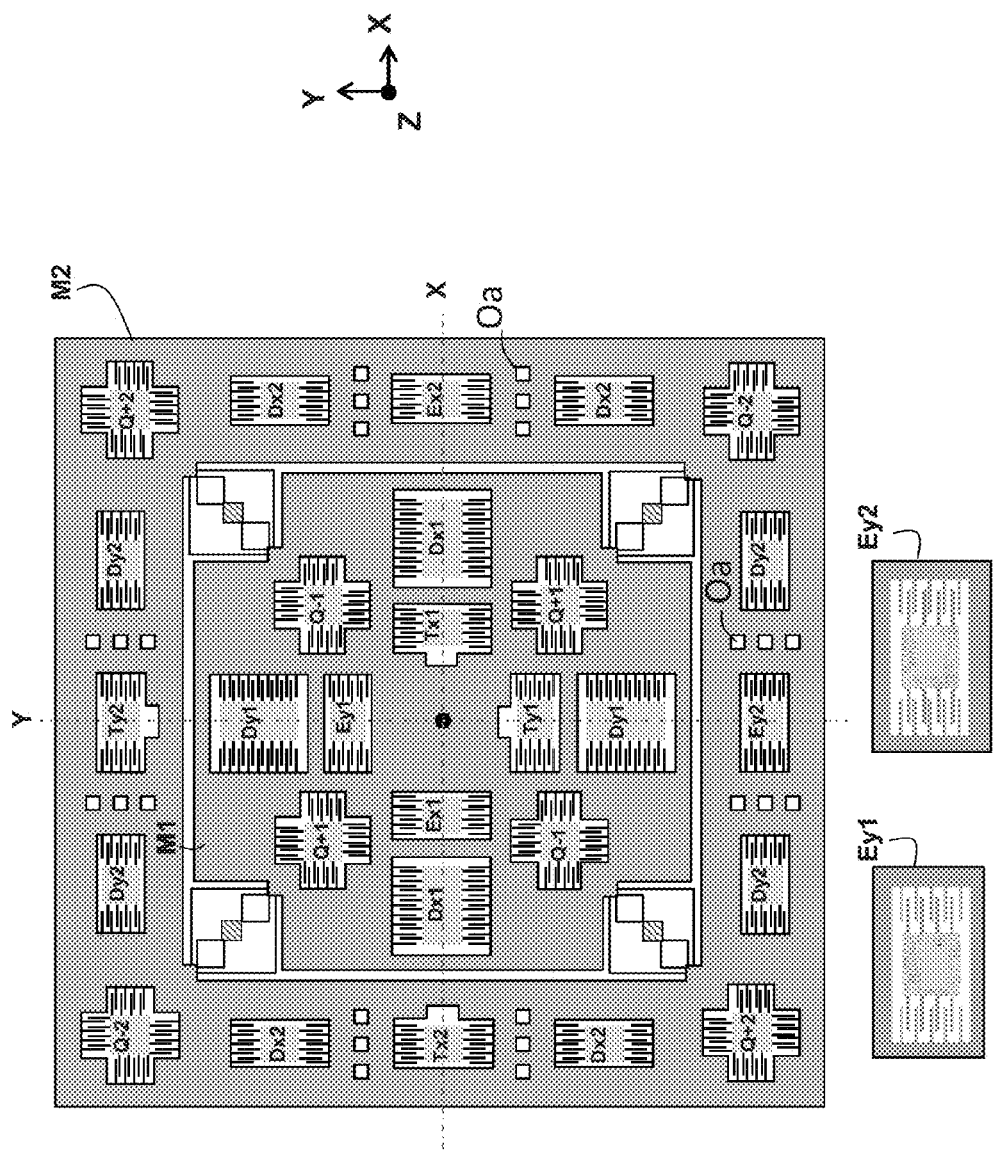
FIGS. 17, 18, 19, 20 represent various possible configurations of mobile assemblies with their transducers, in which the two vibrating masses comprise transducers of each type.

FIG. 17 represents another exemplary complete configuration in which the two mobile masses are provided with transducers and in particular each has at least one excitation transducer, a detection transducer, a frequency adjustment transducer. The number 1 is assigned to the transducers of the inner mass M1 the number 2 is assigned to the transducers of the outer mass M2. In this example, the two masses also each have at least one bias compensation transducer. For the inner mass, the same disposition as in FIG. 16 has been chosen here.

Here the transducers of the two masses are placed in apertures of each of the masses.

Placing transducers on each of the masses exhibits the following advantages: it is possible to compensate the dissymmetry of dynamic stiffness between the two branches of the tuning fork; moreover the excitation and detection transducers are rendered less sensitive to the static de-positionings common to the two masses (for example a de-positioning along their direction of action under the effect of an acceleration) by differential effect; the excitation by the excitation transducers and the detection by the detection transducers is more effective since the aggregate surface area of the comb teeth facing one another for these transducers is doubled overall if the combs are identical on the two masses.

Preferably, the number of mobile-comb teeth of each type of transducer (E, or D, or T or Q) is identical on the two masses so as to optimize by construction the equilibrium between the two mobile assemblies (masses with the mobile combs which are fastened thereto). However, the number of transducers of each type may differ between the two masses; for example it is seen in FIG. 17 that there are two detection transducers Dx1 on the first mass, which are placed on the axis OX and are disposed symmetrically on either side of the axis OY, whereas each of the two detection transducers Dx2 of the second mass is split into two separate transducers disposed pairwise symmetrically with respect to the axis OX and symmetrically with respect to the axis OY; each transducer Dx2 has half as many mobile-comb teeth as a transducer Dx1.

It will be noted that the excitation and detection transducers with dissymmetric interdigitation of the first mass preferably have an inverted sense of dissymmetry with respect to the sense of dissymmetry of those of the first mass (see for example the detail view of Ey1 and Ey2 in FIG. 17), so as to take better account of the fact that the useful vibration mode is in phase opposition on the two masses. When there is a static de-positioning of the masses (induced for example by static accelerations or by stresses outside the sensor), the gap of these comb teeth is reduced for one mass whereas it increases for the other, but the global effectiveness of the excitation and detection transducers remains the same. This results in an insensitivity to first order with respect to these static de-positionings common to the two masses.

It is also noted in FIG. 17 that provision may be made if necessary for adjustment apertures Oa in one of the masses, here the outer mass, to balance the value of the two masses.

Figure 18:
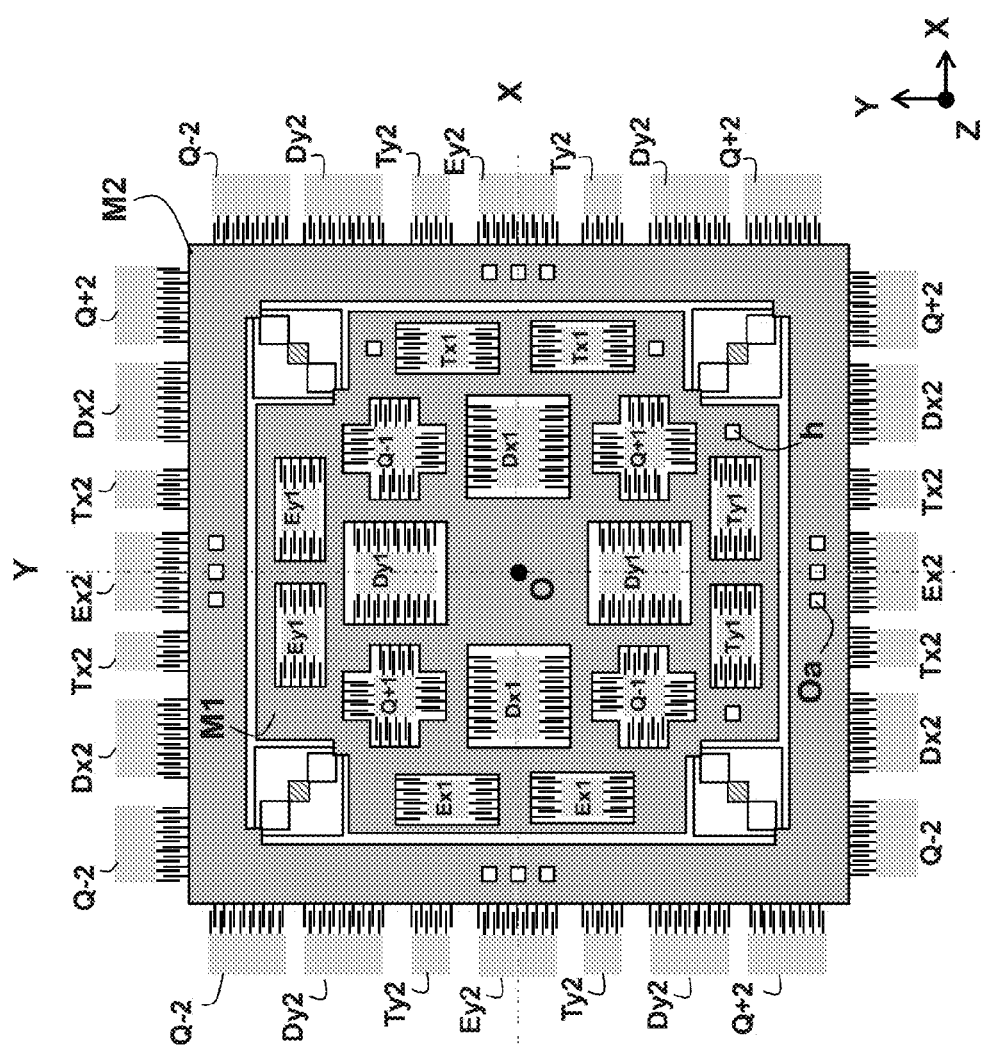

FIG. 18 represents a configuration in which the transducers associated with the outer mass are placed at the periphery of the latter. They could also be placed on the interior edge of the mass or shared between the interior edge and the exterior edge, or shared between the edges and apertures of the mass.

Moreover in the example of FIG. 18, it may be noted that the excitation transducers Ex1 or Ey1 of the inner mass have been split, as have therefore also the adjustment transducers Tx1 or Ty1 which are opposite the transducers Ex1 or Ey1 by symmetry, and that separate apertures h have been made for the compensation of the excess mass of the frequency adjustment transducers Tx1 and Ty1. These particular features could be adopted in any global sensor configuration.

Figure 19:
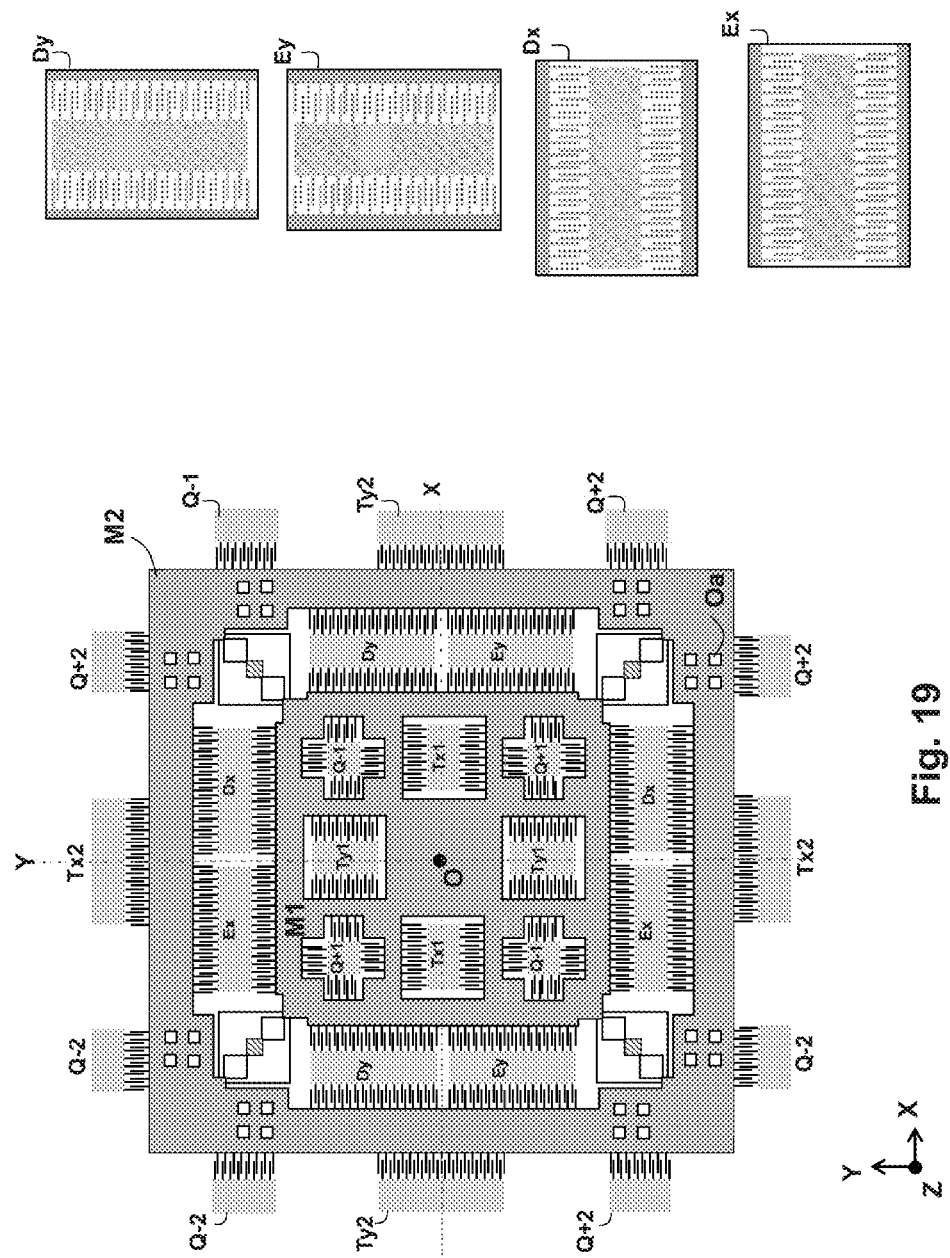

In FIG. 19 an additional possibility is further represented consisting in grouping together the fixed electrodes of the transducers for exciting the two mobile masses, these electrodes therefore having a fixed comb having comb teeth pointing towards the inner mass and another fixed comb having teeth pointing towards the outer mass, the two masses having mobile comb teeth interdigitated respectively with these two fixed combs. Here again, provision is made for the dissymmetry of gap at rest between the fixed teeth and the mobile teeth to be inverted between the inner mass and the outer mass as shown by the detail of the transducer Ex or Ey of FIG. 19 so that the excitation produced by an alternating voltage applied to the fixed electrode of the transducer Ex or Ey gives rise to an excitation motion in phase opposition on the two masses.

Exactly the same disposition is adopted for the detection transducers, also with an opposite interdigitation dissymmetry on the two masses, as is shown by the detail of the transducer Dx or Dy of FIG. 19.

It will be further noted that in FIG. 19, in contradistinction to FIG. 18, it is not a transducer Tx which forms the counterpart of a transducer Ex, but it is in fact another transducer Ex.

Figure 20:
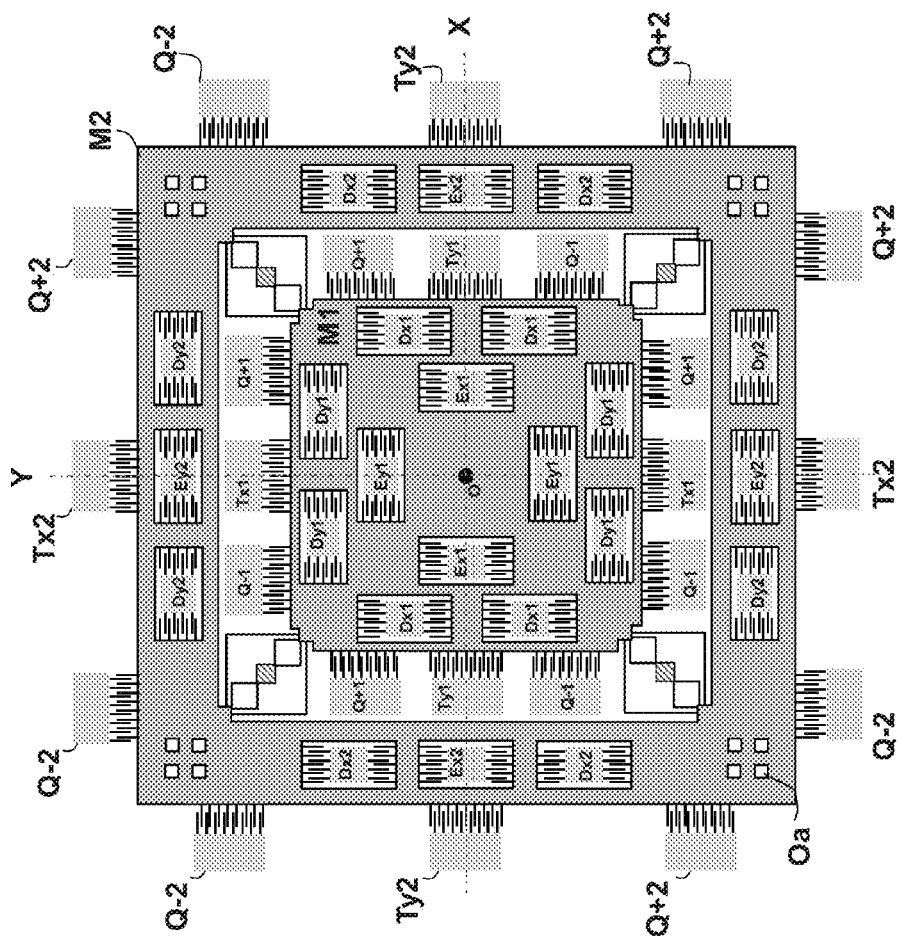

FIG. 20 further represents an example in which the symmetry of disposition of the masses and transducers is further improved with respect to the axis OX and to the axis OY, in that all the transducers acting in the direction of one axis of symmetry have an identical counterpart disposed symmetrically with respect to the other axis of symmetry. Thus, on each mass there are four detection transducers Dx which are symmetric pairwise with respect to OX and with respect to OY; in a similar manner (with the same symmetry) on each mass, four transducers Dy which are symmetric pairwise with respect to OX and with respect to OY; on each mass, two excitation transducers Ex placed on the axis OX with a symmetry with respect to this axis and on each mass, two excitation transducers Ey with a similar symmetric disposition but with respect to the axis OY; two frequency adjustment transducers Tx on each mass, which are placed on the axis OY with a symmetry with respect to this axis; two frequency adjustment transducers Ty for each mass with one and the same symmetric disposition but with respect to the axis OX. The quadrature bias compensation transducers are eight in number on each mass: a transducer Q+ is symmetric with respect to the axis OX of another transducer Q+ with, however, an inversion of the dissymmetry of the interdigitations of combs; a transducer Q+ is symmetric with respect to the axis OY of another transducer Q+, also with an inversion of the dissymmetry of the comb interdigitations. Furthermore a transducer Q– disposed along the direction X (or respectively Y) is symmetric with respect to the axis OY (or respectively OX) of a transducer Q+ disposed along the same direction X (or respectively Y).

It is recalled here, and it is seen in this figure, or in other figures for example FIG. 14, that in the case of the transducers which are of the type that are dissymmetric at rest that is to say the transducers Ex and Ey, Dx and Dy or Q+ and Q–, the symmetry of the pairs of interdigitated combs disposed symmetrically with respect to one of the axes OX or OY is rigorously true only for the mobile electrodes part.

Thus a structure according to the invention is "generally symmetric" along the axes OX and OY, as has been set forth throughout the description, thereby covering possible minor dissymmetries, such as those just set forth in the previous paragraph, and also apertures in one or two of the masses making it possible to compensate the mass unbalances about the axes of symmetry X and Y, in such a way that the centre of gravity coincides with the centre of symmetry of the structure.

The invention claimed is:

1. A micro-machined inertial angular sensor comprising:
two vibrating masses, machined in a generally plane support wafer, which are mobile with respect to the wafer and mobile with respect to one another, suspended from fixed anchoring points of the wafer by suspension springs and coupled together by coupling springs so as to vibrate in phase opposition,
at least one transducer for exciting a vibration motion of one of the masses along a direction X in the plane of the wafer, a transducer for exciting this mass along a direction Y perpendicular to the direction X and in the plane of the wafer, a transducer for detecting a vibration of one of the masses along the direction X and a transducer for detecting a vibration of one of the masses along the direction Y, the excitation transducers and detection transducers each comprising a pair of interdigitated combs having a mobile comb formed of a row of teeth fastened to the vibrating mass and a fixed comb formed of a row of teeth fastened to a fixed electrode, the interdigitation of the teeth at rest being dissymmetric, and
at least one first frequency adjustment electrostatic transducer, as interdigitated combs with symmetric interdigitation at rest, able to apply an adjustable electrostatic stiffness to the vibrating mass along the direction X, and a second frequency adjustment electrostatic transducer similar to the first and able to apply to the vibrating mass an adjustable electrostatic stiffness along the direction Y,
wherein the two mobile vibrating masses are disposed one around the other, as an inner mass and an outer mass, and their centres of gravity coincide at rest,
wherein the coupling springs are each linked on one side to the inner mass and on the other to the outer mass and they have identical stiffnesses along the direction X and along the direction Y,
wherein the stiffnesses of the springs for suspending the inner mass are identical along the direction X and along the direction Y and the stiffnesses of the springs for suspending the outer mass are identical along the direction X and along the direction Y, and they are proportional to the values of the respective masses, and wherein the mobile assembly consisting of a vibrating mass and the parts of transducers fastened to this mass has a structure which is generally symmetric with respect to an axis of symmetry OX parallel to the direction X and passing through the centre of gravity of the mass, and also generally symmetric with respect to an axis of symmetry OY parallel to the direction Y and passing through the centre of gravity of the mass.

2. The sensor according to claim 1, wherein at least one of the vibrating masses is coupled to at least one pair of electrostatic transducers for compensating a quadrature bias, making it possible to modify the distribution of the stiffnesses acting on the vibrating mass so as to align the principal axes of dynamic stiffness with the axes of symmetry OX and OY.

3. The sensor according to claim 2, wherein the pair or pairs of quadrature bias compensation electrostatic transducers are arranged according to one of the following dispositions:
a pair of transducers acting in compensation of positive bias and in compensation of negative bias along the direction X and another pair acting in compensation of positive bias and in compensation of negative bias along the direction Y,
a pair of transducers acting respectively in positive and in negative, these transducers each comprising double combs having teeth oriented along the direction X and teeth oriented along the direction Y,
a transducer for compensating the positive bias acting along one of the directions X and Y, and a transducer for compensating the negative bias acting along the other direction orthogonal to the first.

4. The sensor according to claim 2, wherein the geographical disposition with respect to the axis of symmetry OX of the quadrature bias compensation transducers is identical, if their polarity of action is disregarded, to their geographical disposition with respect to the axis of symmetry OY.

5. The sensor according to claim 3, wherein the geographical disposition with respect to the axis of symmetry OX of the quadrature bias compensation transducers is identical, if their polarity of action is disregarded, to their geographical disposition with respect to the axis of symmetry OY.

6. The sensor according to claim 1, wherein the value of the inner mass is equal to the value of the outer mass, and the stiffness of the springs for suspending the inner mass is equal to the stiffness of the springs for suspending the outer mass.

7. The sensor according to claim 1, wherein the geographical disposition with respect to the axis of symmetry OX of the excitation and detection transducers and of the frequency adjustment transducers, working along the direction X is identical to the disposition with respect to the axis of symmetry OY of the transducers exercising the same functions but working along the direction Y.

8. The sensor according to claim 1, wherein transducers for excitation, for detection, and optionally for frequency adjustment or for quadrature bias compensation, are associated with the inner vibrating mass and other transducers for excitation, for detection, and optionally for frequency adjustment or for quadrature bias compensation are associated with the outer vibrating mass.

9. The sensor according to claim 8, wherein the number of comb teeth of each type of transducer is identical on the inner mass and on the outer mass.

10. The sensor according to claim 7, wherein two excitation or detection transducers acting on the inner mass and on the outer mass in one and the same direction X or Y have interdigitation dissymmetries of opposite sense.

11. The sensor according to claim 8, wherein two excitation or detection transducers acting on the inner mass and on the outer mass in one and the same direction X or Y have interdigitation dissymmetries of opposite sense.

12. The sensor according claim 1, wherein each excitation or detection transducer possesses a common electrode fastened to two fixed teeth combs, the inner vibrating mass and the outer vibrating mass each having a respective mobile comb cooperating with one of the two fixed combs.

13. The sensor according to claim 1, wherein a transducer associated with a vibrating mass for the excitation or the detection along a direction X or Y comprises two pairs of interdigitated combs disposed symmetrically with respect to the direction of excitation or of detection X or Y, with one of the following configurations:
the transducer is divided into two distinct transducers placed symmetrically on either side of the vibrating mass and having their mobile combs placed symmetrically on either side of the vibrating mass, and the fixed combs being disposed symmetrically on either side of the mass,
or else the teeth of the mobile combs are situated symmetrically on either side of a fixed electrode inside an aperture of the vibrating mass, the latter surrounding the pair of combs and the fixed electrode.

14. The sensor according to claim 1, wherein the general configuration of the assembly of the mobile masses, and of the mobile combs associated with these masses is globally symmetric with respect to the axis of symmetry OX and also with respect to the axis of symmetry OY, preferably according to a symmetry of order 4, that is to say an invariance of the configuration when the assembly is rotated by 90° about the axis OZ, this with the possible exception of minor dissymmetries due directly or indirectly to the fact that the frequency adjustment transducers have symmetric interdigitation at rest in contradistinction to the other transducers.

15. The sensor according to claim 2, wherein the general configuration of the assembly of the mobile masses, and of the mobile combs associated with these masses is globally symmetric with respect to the axis of symmetry OX and also with respect to the axis of symmetry OY, preferably according to a symmetry of order 4, that is to say an invariance of the configuration when the assembly is rotated by 90° about the axis OZ, this with the possible exception of minor dissymmetries due directly or indirectly to the fact that the frequency adjustment transducers have symmetric interdigitation at rest in contradistinction to the other transducers.

16. The sensor according to claim 3, wherein the general configuration of the assembly of the mobile masses, and of the mobile combs associated with these masses is globally symmetric with respect to the axis of symmetry OX and also with respect to the axis of symmetry OY, preferably according to a symmetry of order 4, that is to say an invariance of the configuration when the assembly is rotated by 90° about the axis OZ, this with the possible exception of minor dissymmetries due directly or indirectly to the fact that the frequency adjustment transducers have symmetric interdigitation at rest in contradistinction to the other transducers.

17. A method for compensating the anisotropy defects of a sensor according to claim 2, comprising:
a first step of precise alignment of the principal axes of dynamic stiffness of the mobile assembly with the directions X and Y, achieved by the adjusting of voltages applied to the transducers for compensating the quadrature bias, and a second step of equalizing the resonant frequencies along the direction X and along the direction Y, achieved by the adjusting of voltages applied to the frequency adjustment transducers.

18. The method for compensating the anisotropy defects of a sensor according to claim 3, comprising:
a first step of precise alignment of the principal axes of dynamic stiffness of the mobile assembly with the directions X and Y, achieved by the adjusting of voltages applied to the transducers for compensating the quadrature bias, and a second step of equalizing the resonant frequencies along the direction X and along the direction Y, achieved by the adjusting of voltages applied to the frequency adjustment transducers.

19. The method for compensating the anisotropy defects of a sensor according to claim 4, comprising:
a first step of precise alignment of the principal axes of dynamic stiffness of the mobile assembly with the directions X and Y, achieved by the adjusting of voltages applied to the transducers for compensating the quadrature bias, and a second step of equalizing the resonant frequencies along the direction X and along the direction Y, achieved by the adjusting of voltages applied to the frequency adjustment transducers.

20. The method for compensating the anisotropy defects of a sensor according to claim 5, comprising:
a first step of precise alignment of the principal axes of dynamic stiffness of the mobile assembly with the directions X and Y, achieved by the adjusting of voltages applied to the transducers for compensating the quadrature bias, and a second step of equalizing the resonant frequencies along the direction X and along the direction Y, achieved by the adjusting of voltages applied to the frequency adjustment transducers.

\* \* \* \* \*